US006633922B1

United States Patent
Brock et al.

(10) Patent No.: US 6,633,922 B1
(45) Date of Patent: Oct. 14, 2003

(54) OBJECT ACCESS MECHANISM THAT DYNAMICALLY SWITCHES BETWEEN MULTIPLE DISTRIBUTED ACCESS MODELS

(75) Inventors: Anthony Edward Brock, Pine Island, MN (US); Steven Jay Munroe, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 08/990,360

(22) Filed: Dec. 15, 1997

(51) Int. Cl.[7] .................................................. G06F 9/44
(52) U.S. Cl. ...................................................... 709/316
(58) Field of Search ............................... 709/245, 200, 709/303, 213, 246, 203, 101, 316; 712/43, 20, 229, 32

(56) References Cited

U.S. PATENT DOCUMENTS

| | | | | |
|---|---|---|---|---|
| 4,633,387 A | * | 12/1986 | Hartung et al. | 364/200 |
| 5,222,217 A | | 6/1993 | Blount et al. | 395/325 |
| 5,247,632 A | * | 9/1993 | Newman | 395/400 |
| 5,347,632 A | | 9/1994 | Filepp et al. | 395/200 |
| 5,359,730 A | | 10/1994 | Marron | 395/650 |
| 5,421,015 A | * | 5/1995 | Khoyi et al. | 709/1 |
| 5,724,538 A | * | 3/1998 | Morris et al. | 395/416 |
| 5,727,159 A | * | 3/1998 | Kikinis | 709/246 |
| 5,754,818 A | * | 5/1998 | Mohamed | 395/417 |
| 5,781,857 A | * | 7/1998 | Hwang et al. | 455/412 |
| 5,862,328 A | * | 1/1999 | Colyer | 709/203 |
| 5,872,971 A | * | 2/1999 | Knapman et al. | 709/101 |

OTHER PUBLICATIONS

Dave et al. "Proxies, Application Interfaces, and Distributed Systems", pp 212–220, IEEE, Sep. 1992.*
John Rymer, "Distributed object interoperability", Distributed computing monitor, v10, n3 p3(26) 1995.*
John Rymer, "OMG's UNO: object system interoperability at last", Distributed computing Monitor v9 n12 p32(8) 1994.*
K. Dick, "Object Databases and the Web," Object Magazine, p. 59.
A. Ewald et al., "Bringing Objects to You," Object Magazine, pp. 69–70.
T. Atwood, "Object Databases Come of Age," Object Magazine, Jul. 1996, pp. 60–63.
IBM Technical Disclosure Bulletin, vol. 38, No. 9, Aras et al., Sep. 1995, "ATM Signaling Software Reuse through Service Access Points Remapping," pp. 427–430.
Abstract for Patent No. SU1815643, May 15, 1993, "Microcomputer Programs Debugging Device."
Abstract for U.S. Patent No. 4,937,782, Jun. 26, 1990, "Counter control Method for Microcomputer."
Abstract for U.S. Patent No. 4,979,167, Dec. 18, 1990, "Performing Restricted Token Operations on FDDI Network."
Abstract for Abstract No. SU1336119, Sep. 7, 1987, "Control and Computing Data Capture Analog Memory."

(List continued on next page.)

*Primary Examiner*—St. John Courtenay, III
(74) *Attorney, Agent, or Firm*—Steven W. Roth

(57) ABSTRACT

This present invention incorporates the benefits of the function shipping, page shipping and class shipping remote object access models into a single, industry standard programming model. The fundamental mechanism of the present invention is an underlying shipper mechanism, which dynamically selects and updates the remote object access method being employed for any given access based on the most desirable method available at the time of the object access. The shipper mechanism dynamically decides which underlying access mechanism to use based on (1) object access policy rules, and (2) system operational loads and network traffic heuristics. The shipper is further capable of transparently switching from one access model to another while an object access is on-going.

24 Claims, 21 Drawing Sheets

OTHER PUBLICATIONS

Abstract for U.S. Patent No. 4,800,484, Jan. 24, 1989, "Multiprocessor Installation with automatic Switching of Peripherals."

Abstract for U.S. Patent 4,642,621, Feb. 10, 1989, "CT Image Display Device."

Abstract for Patent No. EP–675451, Oct. 4, 1995, "Distributed Data Base Management System."

Abstract for Japanese Patent No. JP 06261320, Sep. 16, 1990, "Monitoring Equipment for Recording Image Information."

Abstract for Patent No. SU–849552, Jul. 28, 1981, "Automatic Selective Telephone Communication Appts."

Abstract for U.S. Patent No. 4,413,338, Nov. 1, 1983, "Concentrator for Remote Data Processing Asynchronous Terminals."

Abstract for JAPIO 94–266596, Sep. 22, 1994, "Flash Memory Storage Device and Information Processor."

Abstract for JAPIO 91–253892, Nov. 12, 1991, "Display Device."

Abstract for JAPIO 90–044467, Feb. 14, 1990, "Word Dictionary Retriever."

Abstract for JAPIO 89–222074, Sep. 5, 1989, "Electric Protection Remote Centralized Control Mechanism."

Inspec Abstract No. C9511–5440–036, Oguchi et al., 1995, "A Proposal for a DSM Architecture Suitable for a Widely Distributed Environment and Its Evaluation."

Inspec Abstract No. C9510–7330–085, Kraske et al., 1995, "VOXAR–A11 ATM Distributed Biomedical Visualization."

Inspec Abstract No. C9509–5620W–009, Cochrane, 1995, "The future: (Information Super Highway or Footpath?)."

Inspec Abstract No. B9506–6210C–035, Min et al., 1995, "Real Time Traffic Estimation in Circuit–Switched Networks."

Inspec Abstract No. B9501–6150M–017, Kapsalis et al., 1994, "New Hybrid MAC–Layer Protocol for Real–Time Bus Networks."

Inspec Abstract No. B9407–0100–070, 1992, "IEEE Multimedia Workshop '92."

Inspec Abstract No. B9306–6150E–008, Fan et al., 1992, "Modeling Time–Constrained Multiple–Access Message Transmission by Generalized Stochastic Petri Nets."

Inspec Abstract No. C9206–5220P–058, Hamlin, 1992, "A System Structure for Teraop Processing."

Inspec Abstract No. C9206–5220P–026, Maresca et al., 1990, "PRAM Emulation on Reconfigurable Processor Arrays."

Inspec Abstract No. B91020003, Morris et al., 1990, "Master Station Control and Capacity Assignment for ITALSAT Network."

Inspec Abstract No. C91004511, Tang et al., 1990, "Software Combining Algorithms for Distributing Hot–Spot Addressing."

Inspec Abstract No. B89044185, Shin et al., 1989, "Message Communications in a Real–Time System with a Polled Bus."

Inspec Abstract No. B88021618, Audisio et al., 1989, "An Experimental Integrated Multiservice LAN."

Inspec Abstract No. B86037531, Despres et al., 1984, "Towards Service Integration in Office Communication Networks."

Inspec Abstract No. B83051053, Grompone et al., 1983, "Objects for Real Time Executives in Message Switching Exchanges with Distributed Architecture."

Inspec Abstract No. B83050885, Black et al., 1983, "X.25 Packet–Switching Networks: Problems and Solutions."

Inspec Abstract No. B82016196, Casaglia, 1981, "An Integrated Approach for the Organisation of Geographically Distributed Networks."

Inspec Abstract No. B81041988, Coyne, 1981, "The UH/CLC Network."

Inspec Abstract No. C85029501, Lau et al., 1984, "Cluster-–Based Naming for Reliable Distributed Systems."

Inspec Abstract No. B84002166, Kadota et al., 1983, "Probability Distributions of Randomly Moving Objects on a Plane."

Inspec Abstract No. C7511685, 1975, "Computer Records All Container Movements at Nuclear Fuel Plant Mater. Handl. Eng."

Text of IBM Technical Disclosure Bulletin, vol. 37, No. 6A, Rosiles, Jun. 1994, pp. 457–458, "Graphical Handling of Orphans in a Distributed Computing Environment."

Text of IBM Technical Disclosure Bulletin, vol. 37, No. 11, Behrs et al., Nov. 1994, pp. 337–338, "Software Communications Object Solves Deadlock Conditions."

Text of IBM Technical Disclosure Bulletin, vol. 37, No. 7, Ackerman et al., Jul. 1994, pp. 85–88, "Memory Protection Architecture for Real–Time Applications."

Text of Dossier for IBM Docket No. GE993–019; Schaefer et al.; Sep. 14, 1993: "Computer System and Method for Performing Multiple Tasks."

Text of Dossier for IBM Docket No. PO992–031; Marron; Dec. 4, 1992; "Method of Operating a Data Processing System Having Dynamic Software Update Facility."

Text of Dossier for IBM Docket No. RO994–078; Mullins et al.; Jun. 7, 1995; "Method and System for High Performance Multithread Operation in a Data Processing System."

* cited by examiner

| Mem Obj ID | Virt addr | Cohort ID | Media ID | Auth Cntl | Cnt |
|---|---|---|---|---|---|
| Mem Obj ID | Virt addr | Cohort ID | Media ID | Auth Cntl | Cnt |
| Mem Obj ID | Virt addr | Cohort ID | Media ID | Auth Cntl | Cnt |
| ... | ... | ... | ... | ... | |

FIG. 5C

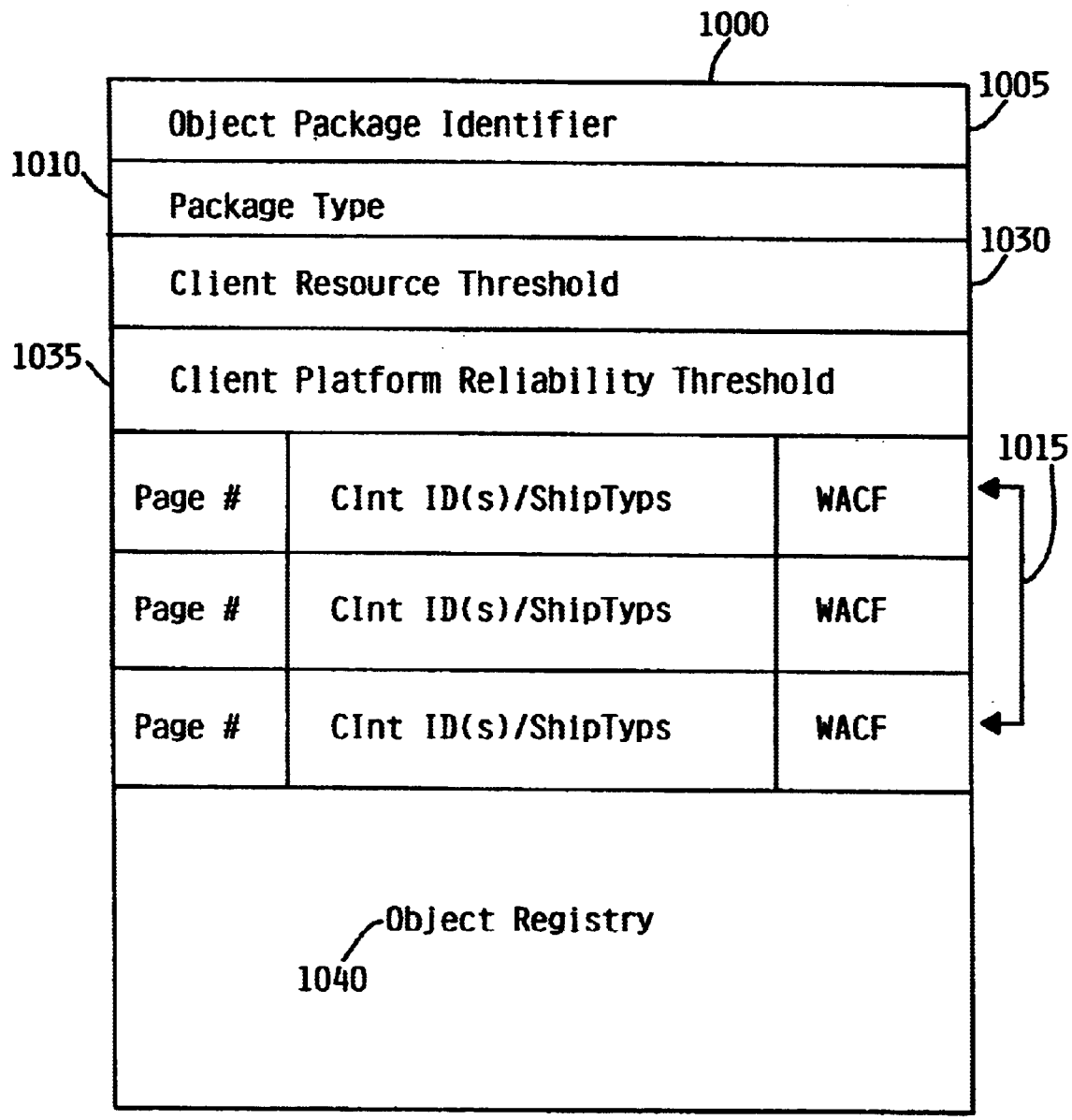
FIG. IOA

OBJECT ACCESS MECHANISM THAT DYNAMICALLY SWITCHES BETWEEN MULTIPLE DISTRIBUTED ACCESS MODELS

RELATED PATENT APPLICATIONS

This application is related to the following U.S. patent applications: Ser. No. 08/772,663, now U.S. Pat. No. 6,272,523 filed Dec. 20, 1996; Ser. No. 08/772,705, now U.S. Pat. No. 6,058,423 filed Dec. 23, 1996; and Ser. No. 08/771,550, filed Dec. 23, 1996.

FIELD OF THE INVENTION

The present invention generally relates to data processing systems. More particularly, the present invention relates to remote object access mechanisms.

BACKGROUND OF THE INVENTION

In the years since their inception, computer systems have become more and more popular. This popularity stems from the fact that computers can be used to perform a variety of complex tasks in an efficient manner. The mechanisms used by computer systems to perform these complex tasks are called computer programs.

Like computer systems themselves, the development of computer programs has been an evolutionary process. Early computer systems used what was called a "one address" computer programming language. This language allowed for only the most rudimentary computer programs. By the 1960s, however, computer programs had become so large and complex that it was difficult to manage and control their development and maintenance. Therefore, the focus of the 1970's was on the development of programming methodologies and environments that could better accommodate the increasing complexity and cost of large computer programs. One such methodology is known in the industry as Object-Oriented Programming (OOP). Though it has been some time since the fundamental notions of OOP were first developed, OOP systems are becoming more and more prevalent because it is felt that the use of OOP can greatly increase the efficiency of computer programmers.

As its name suggests, objects are central to OOP technology. A single object represents an individual operation or a group of operations that are performed by a computer system upon information controlled by the object. Objects can be thought of as autonomous agents that work together to perform certain tasks. A single object represents an individual operation or a group of operations that are performed by a computer system upon information controlled by the object. The operations of objects are called "methods" and the information controlled by objects is called "object data" or just "data." Methods and object data are said to be "encapsulated" in the object.

When a method of one object needs access to the data controlled by a second object, it is considered to be a client of the second object. To access the data controlled by the second object, one of the methods of the client (i.e., a client method) will call or invoke the second object to gain access to the data controlled by that object. One of the methods of the called object (i.e., a server method in this case) is then used to access and/or manipulate the data controlled by the called object. Sometimes entire computer programs are made up of groupings of objects and sometimes objects are simply accessed by more traditional computer programs to perform one specific task or subtask. Regardless of whether an object is accessed by another object or by a more traditional computer program, the object which contains the method that is being called is said to be a server object and the accessing entity is said to be a client of that object.

Objects are further characterized as being either transient or persistent and as either being local or remote. A transient object is a server object that is created upon request by a client and that exists only so long as the requesting client object has a need for it. By contrast, a persistent object is an object that remains available for use by different clients until it is expressly destroyed. A server object is said to be local if it resides on the same computer system as the client program. A server object is said to be a remote object when it is located on different computer system than the client programs that it serves. Client programs communicate with remote server objects through the use of what are termed "remote object access mechanisms." These mechanisms are very important because they are the backbone upon which distributed object computing is based.

There are currently two basic types of remote object access models that are used within the various segments of the computer industry. Although these two models are often described using differing terminology, they are referred to within this patent document as "page shipping" and "function shipping." Page shipping is currently most strongly associated with Object-Oriented Database (OODB) providers such as Object Development Inc. (ODI) and Versant Object Technology Inc. Function shipping, which is a newer approach, is an attempt at standardization that is supported by a group called OMG. OMG, which stands for Object Management Group, is composed of a group of software Vendors that includes IBM, Digital Equipment Corporation, Hewlett-Packard and others.

Each model is known in the industry to have certain strengths and certain weaknesses. For example, the page shipping model, which performs well when a server object or set of server objects is repeatedly accessed by a client program on the same computer system, does not perform well in situations where client programs on different computer systems demand simultaneous access to the same server object or set of server objects. The function shipping model, on the other hand, does perform relatively well in situations where client programs on different computer systems demand simultaneous access to the same server object or set of server objects, but does not perform well in the more typical repeated access situation.

Another problem with the two remote object access models is that programmers are forced to write their programs differently under, each model. This lack of uniformity means that programs must be explicitly rewritten and recompiled to operate under a different model. Stated another way, programs that are written using the page shipping model cannot be used with the function shipping model and programs written using the function shipping model cannot use the page shipping model.

While industry experts are able to debate the respective strengths and weaknesses of each of these remote object access mechanisms, the basic truth is that the potential of distributed object computing will never be fully realized without a remote access mechanism that maximizes the benefits of each of the two models without suffering from each model's inherent shortcomings.

SUMMARY OF THE INVENTION

The preferred embodiment of the present invention involves a shipper mechanism that serves remote object access requests in accordance with either the page shipping model or the function shipping model. The shipper operates under the page shipping model in the standard way, but services clients under the function shipping model by page shipping prebuilt pages, which we term proxy pages. As its name suggests, a proxy page is a shippable memory page that contains proxy objects. The shipper mechanism also includes a switch submechanism that dynamically switches between the two models based on a variety of network and computer system factors (called environment factors), while nevertheless providing a single, consistent interface to the programs it serves.

BRIEF DESCRIPTION OF THE DRAWINGS

FIG. 5C is a diagram of the active block table of the preferred embodiment.

FIG. 10A is a diagram of the object package of the preferred embodiment.

DESCRIPTION OF THE PREFERRED EMBODIMENT

Figure 1:
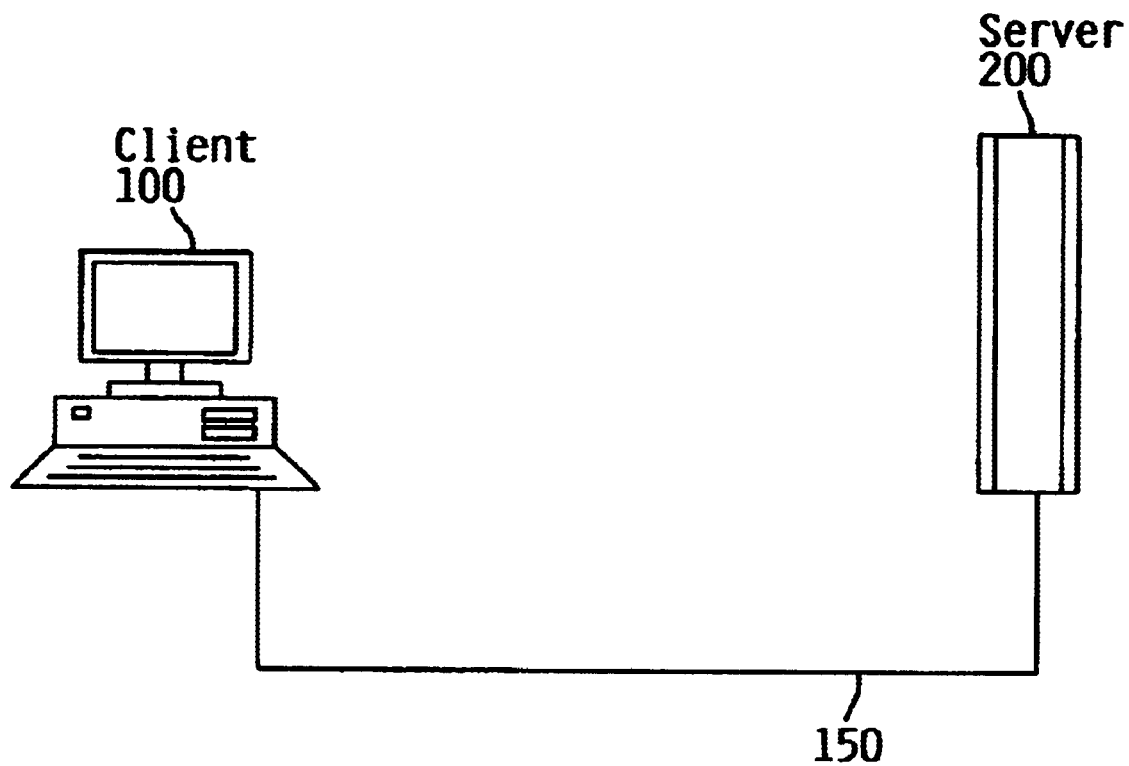
FIG. 1 is a diagram of the network of the preferred embodiment

Overview—the Two Basic Types of Remote Object Access Models

The following is an overview of the two basic types of existing remote object access models. A general overview of virtual addressing is also provided as a fundamental to understanding the various models. Those skilled in the art will understand that the following overview is highly generalized so as to provide the reader with a rudimentary understanding of the terms and concepts involved in a description of the preferred embodiment of the present invention. Accordingly, those readers who are already familiar with these two models may find it more expedient to proceed directly to the Detailed Description section, which immediately follows this Overview section.

Virtual Addressing

To understand page shipping, the reader must first have a basic understanding of the concept of "virtual addressing."

As is well known, information (called data) is stored in the memory of a computer system. Computer system memory is generally categorized into two types. While there are various names used to describe these two basic types of computer system memory, the terms "main memory" and "auxiliary storage" are quite common in the industry. Information stored in main memory is located via addresses known as real addresses, while information stored in auxiliary storage is located in a way that is specific to the particular type of auxiliary storage device used in the particular computer system. In general, main memory is used by the computer system to store information that is of current interest to the programs executing on the computer system's processor. Auxiliary storage, on the other hand, is used to store information that is not currently needed by the computer system's programs.

Over the years, computer system designers have created numerous types of addressing schemes. While these addressing schemes are quite complicated and vary to a large degree, most modern day addressing schemes share the important concept of virtual addressing. As its name suggests, the concept of virtual addressing involves what are referred to as virtual addresses. Fundamentally speaking, once a program has a virtual address, it can use that virtual address to gain access to the associated information without having to understand the actual physical location of the information. In other words, virtual addressing allows programs to locate and access needed information through a single virtual address regardless of whether the information is actually stored in main memory or in auxiliary storage. When taken together, the virtual addresses of a computer system are said to form the computer system's virtual address space, or just address space for short. The address space is then typically broken up into logical blocks (called pages) that are used to manage the address space and to help locate information.

In operation, a program that needs to gain access to a particular piece of information presents the virtual address to the computer system. The computer system first checks to see if the information is available in main memory. The computer system does this by attempting to translate the presented virtual address into a real address. If the translation is successful, the computer system simply allows the program to go ahead and access the information using the real address. However, if the translation fails, the computer system's processor knows that it cannot access the information directly. Therefore, the computer system will move the needed information from auxiliary storage into main memory, translate the virtual address into a real address, and then allow the program to access the information using the real address. When the information is brought into main memory from auxiliary storage, it is typically brought in a page at a time. In other words, pages are considered the "unit of transfer." Thus, this above-described translation failure situation is called a "page fault."

One advanced form of virtual address is called single-level-store. The single-level-store architecture, which was pioneered by IBM, involves what can be thought of as persistent virtual addresses. In this context, a persistent address is one that becomes a lasting property of a given piece of information, such that the same address can always be used to gain access to the same piece of information until the piece of information is intentionally removed from the computer system's memory. This should be contrasted with more conventional two-level-store architectures, where virtual addresses are not persistently associated with particular pieces of information, such that different virtual addresses are used at different times to access the same piece of information.

In the context of computer system networks, a single-level-store virtual address space is said to span systems, such that it becomes an immense distributed virtual address space. When a page fault occurs on one system in a network of computer systems, it can mean that the page at issue must be brought over from another system. This network environment where multiple computer systems share one very large virtual address space, is the environment used in the preferred embodiment.

Page Shipping

The page shipping model works through the use of page faults. When a client program calls a method on a server object, it presents the virtual address of the method program to the central processing unit (CPU) of the computer system. The CPU responds by checking its page table to determine whether the virtual address is referencing a memory page that is currently in main memory. (A page table is essentially a list of all of the memory pages in main memory at a given time and the real addresses that go along with those pages.) If the referenced page is listed in the table, the CPU will first use the table to translate the virtual address into the associated real address and then initiate execution of the called method program via the real address.

If the referenced page is not in the page table, the CPU signals a page fault. A page fault means that the CPU cannot process the client program's request without assistance from a computer system entity referred to as a "pager." The pager inspects the virtual address and determines where the referenced object is located (i.e., whether or not the object is located on another computer system, and if so, which one). If the object is located in the subject computer system's auxiliary storage, the pager simply brings the associated page into main memory so that the referenced object can be accessed by the client program. If the pager determines that the referenced object is on a different computer system, the pager requests "shipment" of the page (hence the name page shipping) from the other computer system.

When the page arrives, the pager brings it into main memory so that the referenced object may be accessed by the client program. The memory page contains more than just the referenced object, however. There are typically other objects contained in the memory page in addition to the object for which the page fault occurred. Object-oriented database management systems will often organize objects into pages by "clustering" related objects together in the same memory page or set of memory pages. Once the memory page is placed into main memory, the client program is able to access the object (and any of the other objects in the page) as if it were a local object. The client program's ability to access the remote server object as if it were a local object (after the memory page has been shipped to the client program's computer system) is a key advantage of the page shipping model. A major disadvantage to this approach, though, is the fact that once the page has been shipped to a requesting client program's computer system, its objects become unavailable to client programs that reside on other computer systems until the updated page is returned by the first client.

Function Shipping

The function shipping model uses a mechanism called an object requester-broker (ORB). The ORB, which executes on both the client computer system and on the server computer system, interacts with client programs to satisfy their requests. When a client program wishes to access a remote sever object, it interfaces with the ORB, which creates what is referred to as a "proxy object" as a result of the request. As its name suggests, a proxy object is not real object, but is instead a stand-in for the real server object. Proxy objects do not contain any real executable code, but rather include only the interface to the method program (i.e., the method call statement) and an instruction that passes control of the call to the client services of the ORB. The ORB relays the client's request to the server services of the ORB (i.e., that part of the ORB that executes on the server computer system). The server portion of the ORB then invokes the requested method program on the actual server object. The result of the call is then sent back to the client program by the ORB.

The proxy objects of the function shipping model provide a key advantage over the page shipping model. Namely, a proxy object allows client programs on different computer systems to effectively share server objects without having to wait for sole access to the server object. The biggest disadvantage of the proxy objects of the function shipping model, though, is the overhead associated with each method call. As described above, each method call involves a network call to the server services of the ORB, which is expensive from a performance perspective. This problem is exacerbated by the fact that calls to objects tend to be repeated. In other words, once a client program references a given method of a given object, its subsequent references will oftentimes involve references to different methods of the same object or to other objects that are related to the initially referenced object.

Detailed Description

Turning now to the drawings, FIG. 1 shows a block diagram of the network of the present invention. As shown, client computer system 100 (referred to hereafter as client 100) is respectively connected to server computer system 200 (referred to hereafter as server 200) via communications mechanism 150. While client 100 and server 200 are shown as being different devices, it should be noted here at the outset that they are peer entities for the purposes of the present invention. It should be further noted that the statement of whether a computer is a client or a server is one of relativity. In other words, a computer that is said to be a client relative to another computer because its programs have a client relationship with the programs on that other computer system may well itself be a server computer relative to still other computers (i.e., because programs of those other computers have a client relationship with some of its programs). In fact, two computers may simultaneously be both client and server relative to each other, and a single computer system may well be a server relative to its own client programs.

Figure 2:
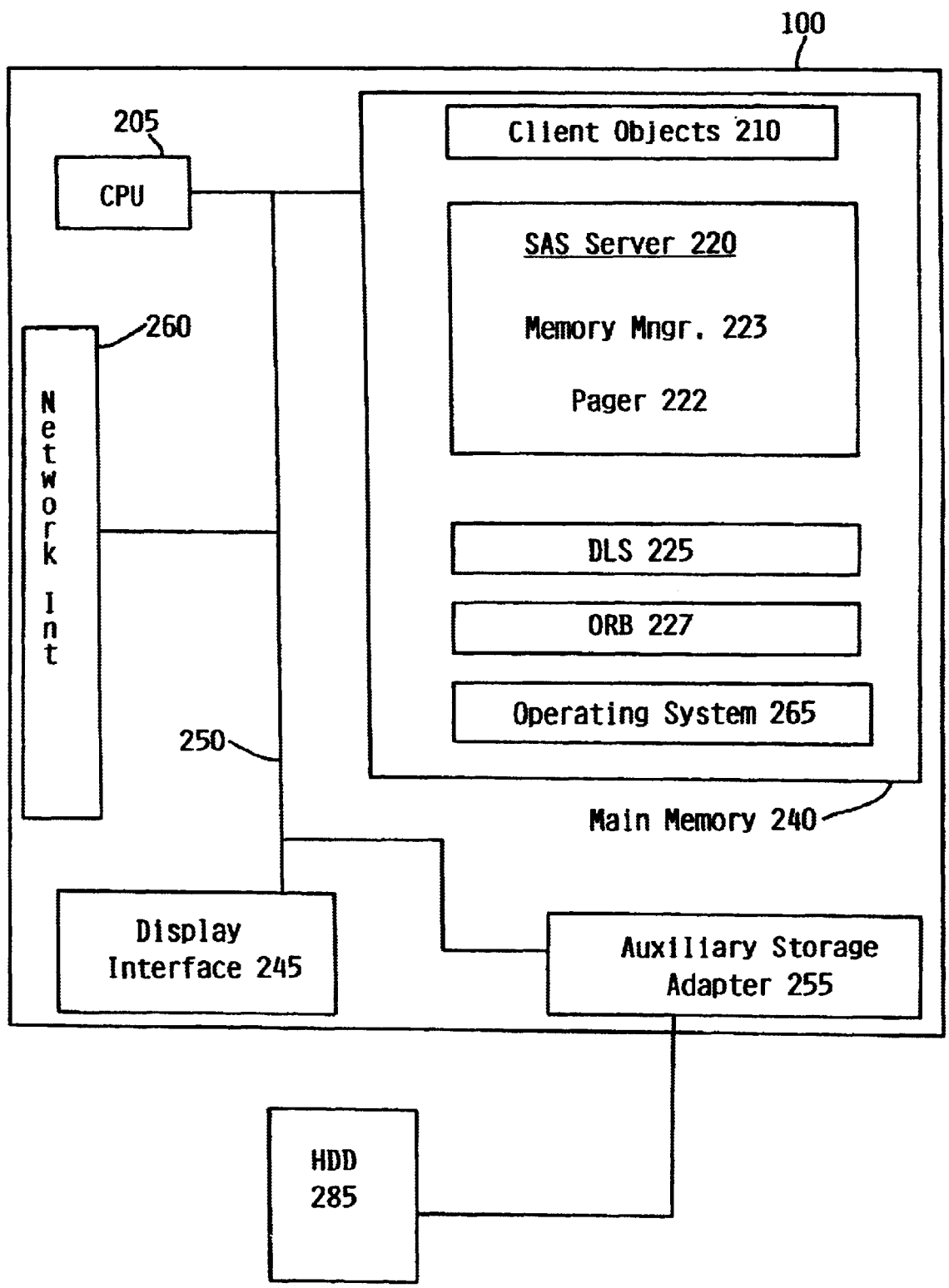
FIG. 2 is a diagram of the client computer system of the preferred embodiment.
Figure 3:
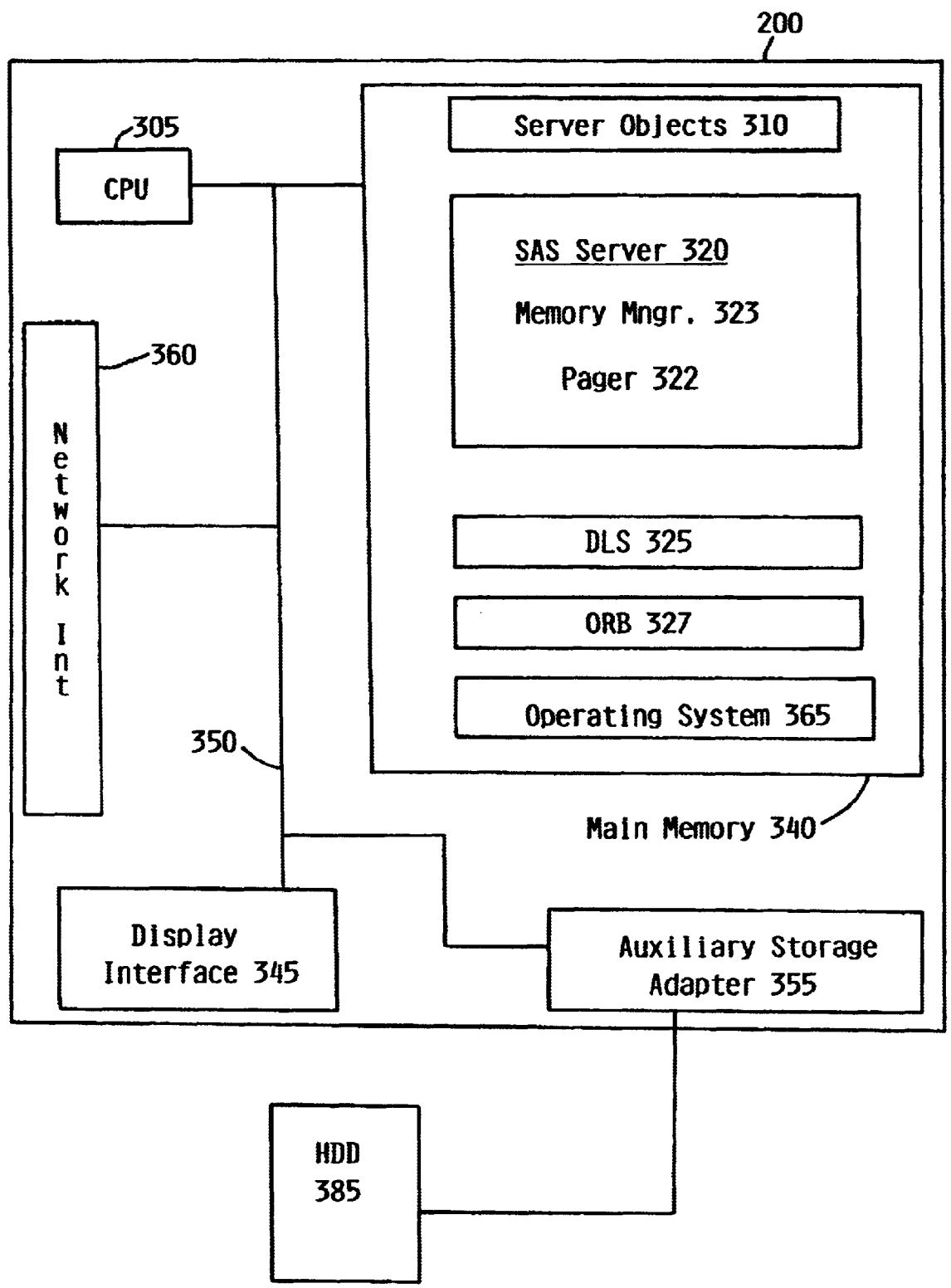
FIG. 3 is a diagram of the server computer system of the preferred embodiment.

FIG. 2 shows client 100 in greater detail and FIG. 3 shows server 200 in greater detail. As mentioned earlier, these two devices are peer entities, having substantially identical components. Accordingly, FIGS. 2 and 3 will be described together. Client 100 and server 200 of the preferred embodiment are enhanced IBM PowerPC computer systems. However, those skilled in the art will appreciate that other types of computer systems could be used.

As shown in FIGS. 2 and 3, client 100 and server 200 each comprise main or central processing unit (CPU) 205/305 connected to main memory 240/340, display interface 245/345, auxiliary storage adapter 255/355, and network interface 260/360. These system components are interconnected through the use of system bus 250/350. Auxiliary storage adapter is used to connect mass storage devices (such as HDD device 285/385) to the computer systems of the preferred embodiment. CPU 205/305 is a IBM PowerPC processor that has a 64 bit address bus, although other comparable central processing units could be used.

The computer systems of the preferred embodiment utilize well known virtual addressing mechanisms that allow their programs to behave as if they have access to a large, single storage entity instead of access to multiple, smaller storage entities such as main memory 240/340 and HDD 285/385. Therefore, while client objects 210, server objects 310, SAS server 220/320 DLS 225/325, ORB 227/327, and operating system 265/365 are shown to reside in main memory 240/340, those skilled in the art will recognize that these programs are not necessarily all completely contained in main memory 240/340 at the same time. (The term "computer system memory" is used herein to generically refer to the entire virtual memory of each of the computer systems of the preferred embodiment.) It should also be noted that certain portions of the entities shown in main memory 240/340 may reside on other computer systems (i.e., be in the computer system memory of any one machine), yet still be addressable within the distributed virtual address space of the preferred embodiment.

Client objects 210 (shown as residing on client 100) and server objects 310 (shown as residing on server 200) are used in this patent to illustrate the interaction between client methods and server methods; however, as mentioned above the notion of an object being a client object or a server object should not be taken to mean that they cannot perform different roles (i.e., client versus server) in different situations.

SAS server 220/320 is further shown to comprise memory manager 223 and pager 223. Memory manager 223 is explained in more detail in the text associated with FIG. 5A. Pager 223 is explained in more detail in the text associated with FIGS. 4 and 6.

Distributed Location Services 225/325, which is the subject of two related patent applications (Ser. Nos. 08/772,663 and 08/772,705) that are hereby incorporated by reference, is the mechanism used in the preferred embodiment to determine the location of the various server objects. Those skilled in the art, however, will recognize that the benefits and advantages of the present invention are not tied to the particular type of location services used.

ORB 227/327, which stands for Object Requester-Broker, is the CORBA mechanism that is used to send method calls from client to server via proxy objects. It should be noted here that ORB 227/327 is a stream-lined ORB that does not itself build proxy objects, but instead relies on shipper 410 to supply it with prebuilt proxy pages. Shipper 410 is explained in more detail in forthcoming paragraphs.

Operating system 165 is a multitasking operating system known in the industry as the Micro-Kernel Operating System. This operating system is available from the Open Software Foundation. However, those skilled in the art will appreciate that the spirit and scope of the present invention is not limited to any one operating system. During experimentation, the inventors used IBM's version of the Micro-Kernel Operating System, which is a slightly modified version of the Open Software Foundation version. However, none of the differences between the two versions are important in the context of the present invention.

Display interface 245/345 is used to directly connect one or more monitors to the computer systems of the present invention.

Network interface 260/360 is used to interconnect the computer systems of the preferred embodiment in networked fashion, so as to enable communications mechanism 150. However, it should be understood that the present invention applies equally no matter how client 100 is connected to server 200 (i.e., regardless of whether the connection(s) is made using present-day analog and/or digital techniques or via some networking mechanism of the future).

As a final preliminary matter, it is important to note that while the present invention has been (and will continue to be) described in the context of fully functional computer systems, those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media such as floppy disks, hard disk drives and CD ROMs and transmission type media such as digital and analog communications links, be they line-based communication links or wireless communication links.

Figure 4:
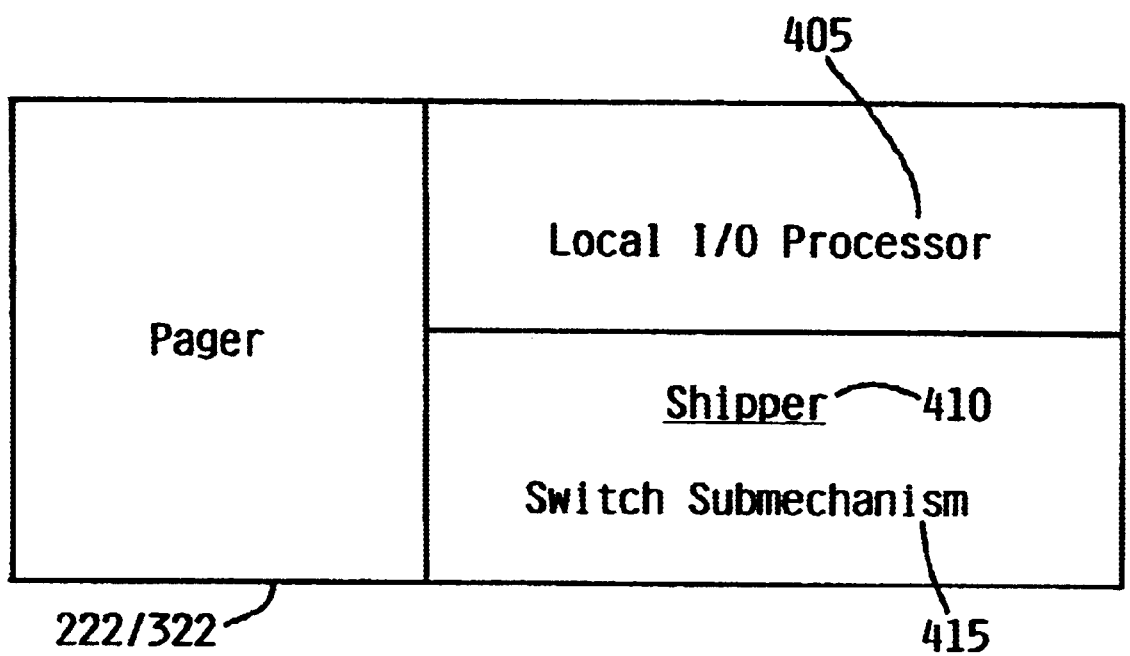
FIG. 4 is a diagram of the structure of pager used in the preferred embodiment.
Figure 11A:
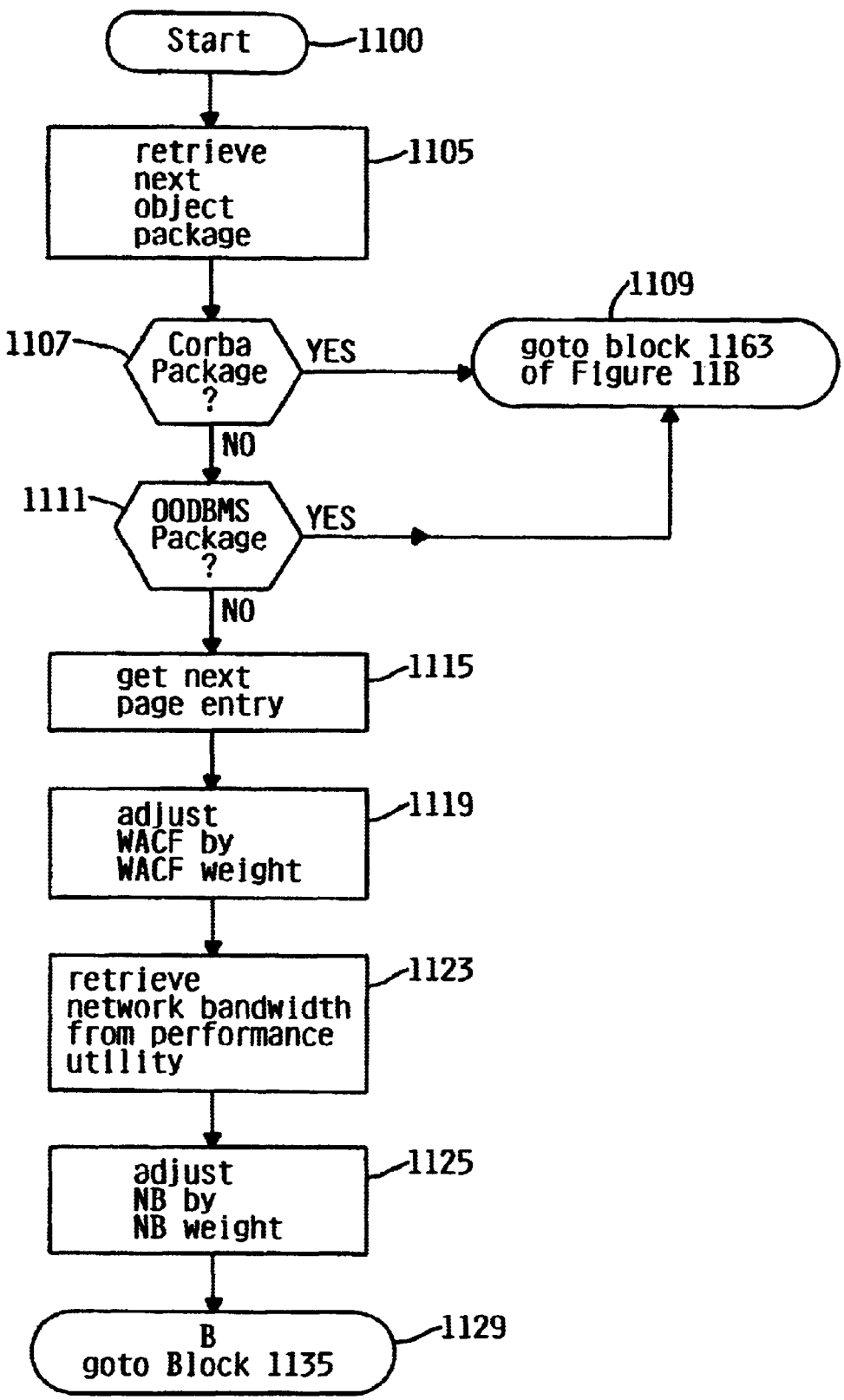
FIGS. 11A and 11B are diagrams of processing of the switch submechanism of the preferred embodiment.
Figures 1, 11B:
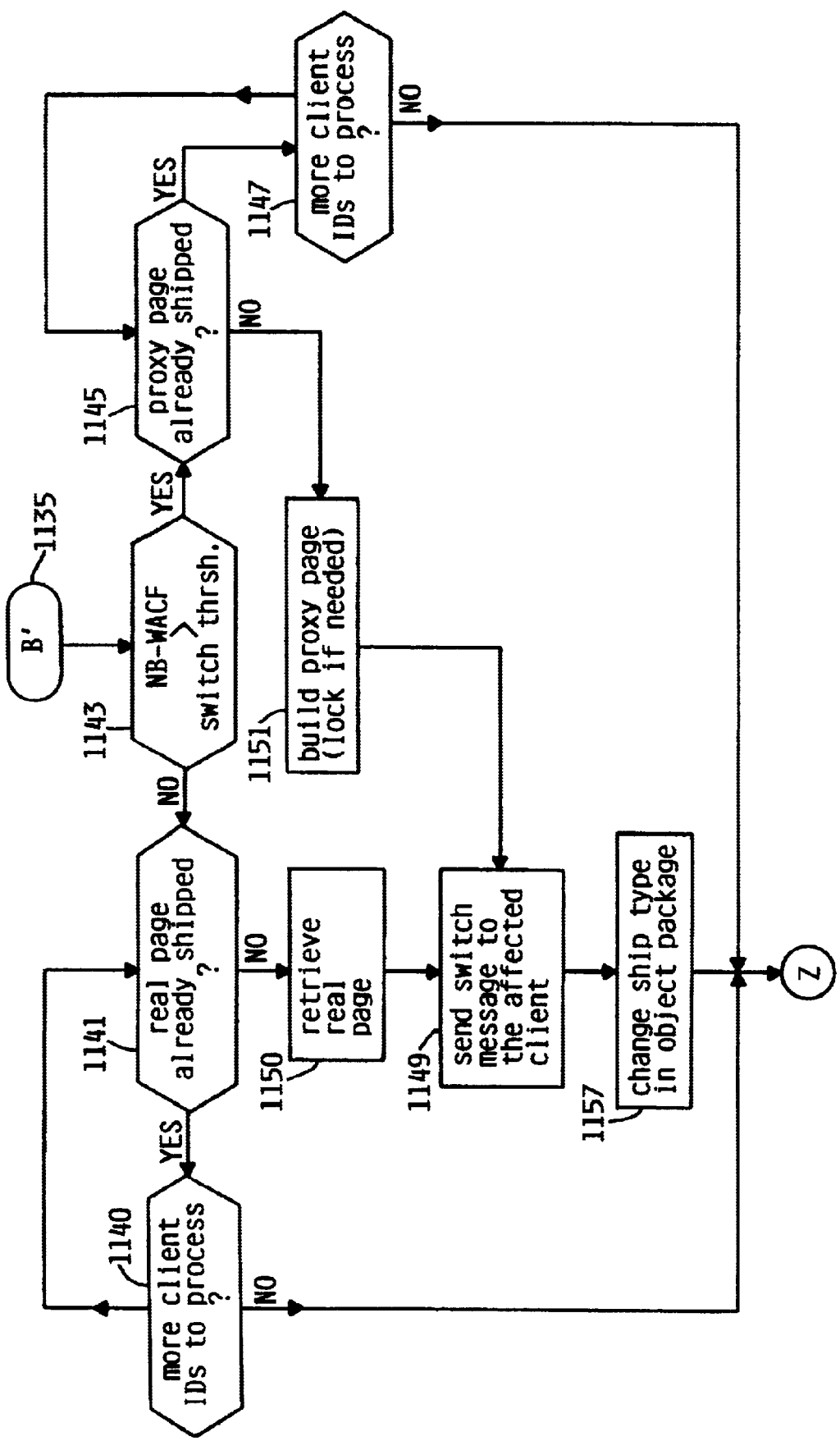
Figures 2, 11B:
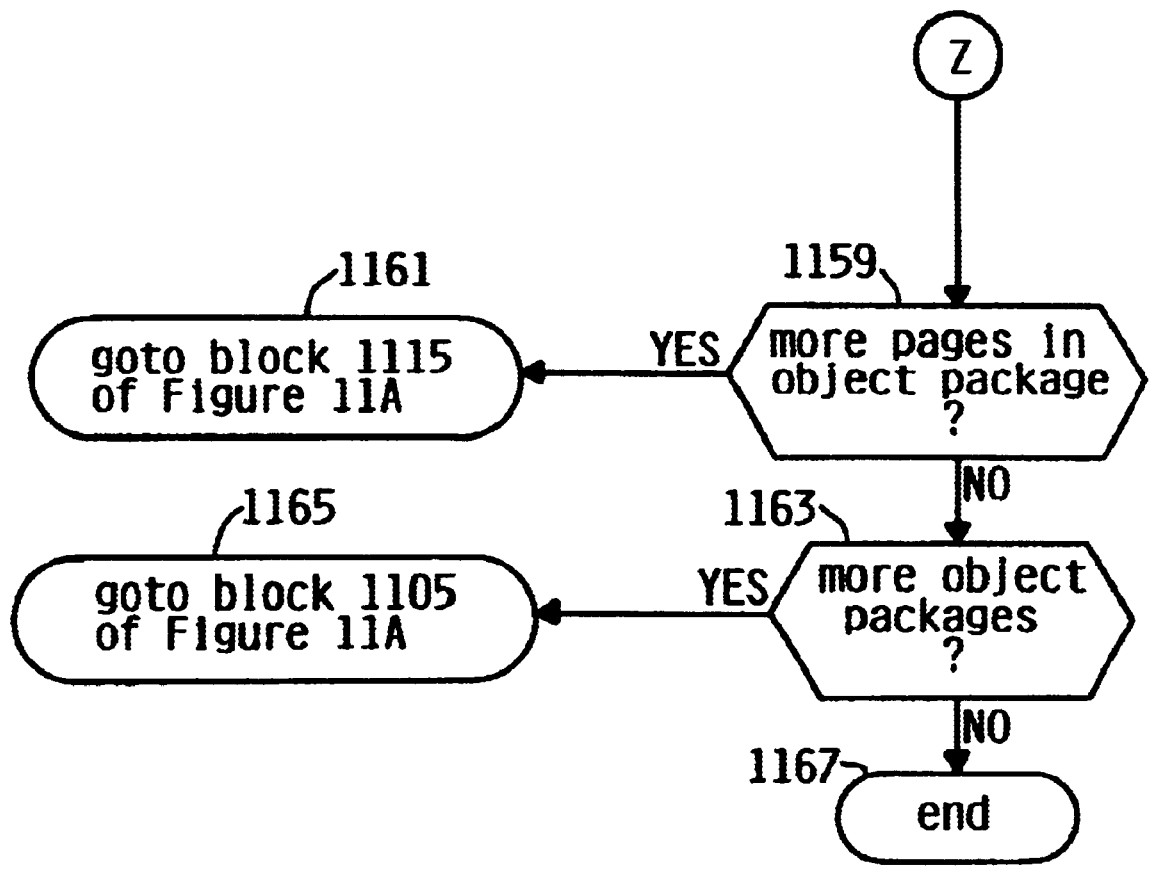

FIG. 4 is a diagram that shows additional details regarding the internal structure of pager 222/322. At this point it is important to point out that operating system 265/365 includes its own pager, known as the default pager. However, the Micro-Kernel Operating System also allows for the addition of customized pagers. Pager 222/322 is an additional pager that provides specialized functions. As shown on FIG. 4, pager 222/322 includes local I/O processor 405 and shipper 410. Local I/O processor 405 is the mechanism that is responsible for retrieving memory pages from auxiliary storage (i.e., HDD 285/385). Shipper 410 is responsible for retrieving memory pages from other machines. For example, shipper 410 would be the entity responsible for retrieving a memory page from server 200 for use by a client object on client 100. Included within shipper 410, is switch submechanism 415. Switch submechanism 415, which will be explained in more detail in the text associated with FIGS. 11A and 11B, is responsible for dynamically changing mode under which a particular page was shipped from a server to a client (i.e., from a page containing the real memory objects to a page containing proxy objects or vise versa).

Figures 1, 5A:
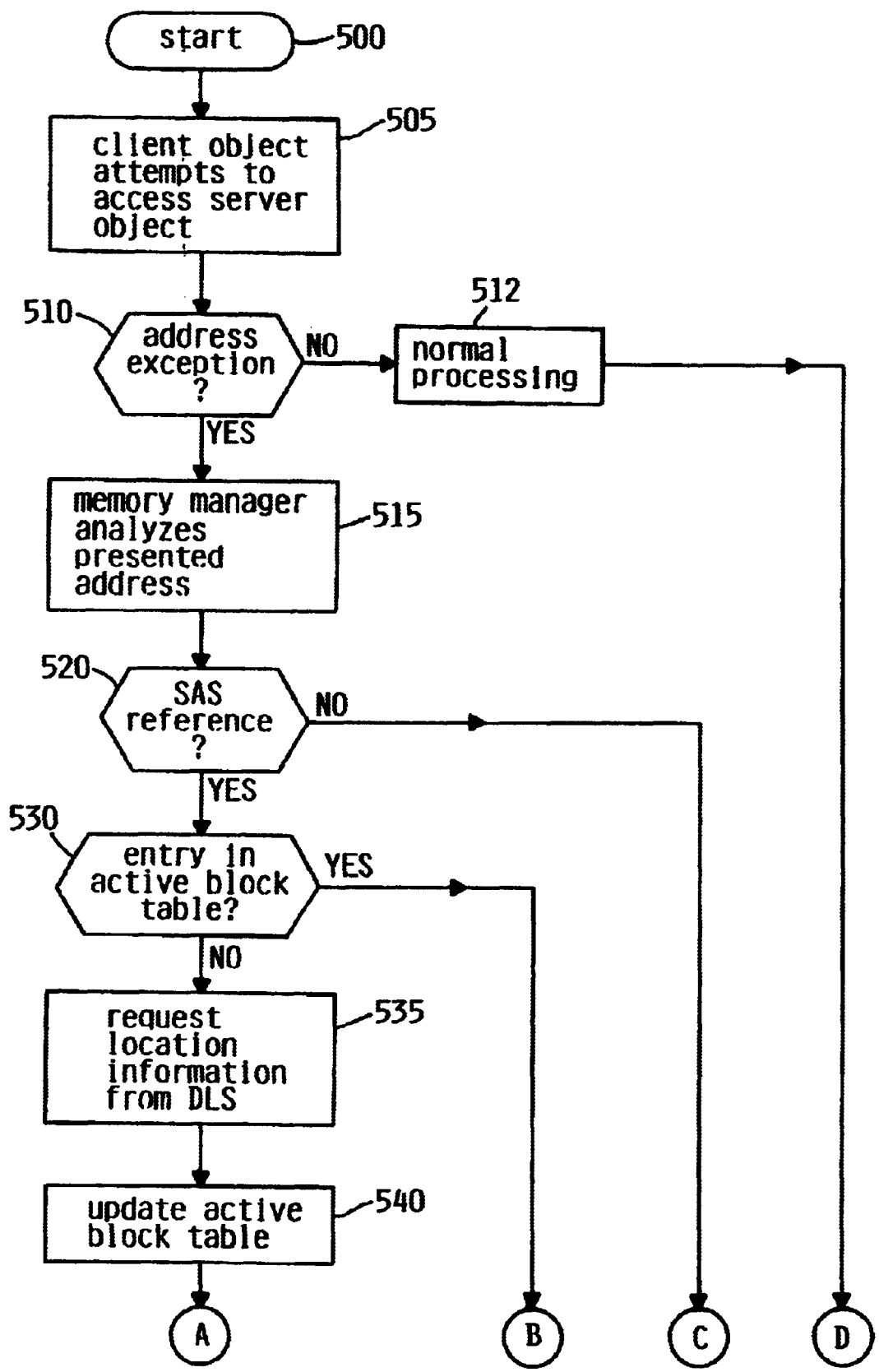
FIG. 5A is a diagram showing the client-side processing used in the preferred embodiment to carry out a remote object access request.
Figures 2, 5A:
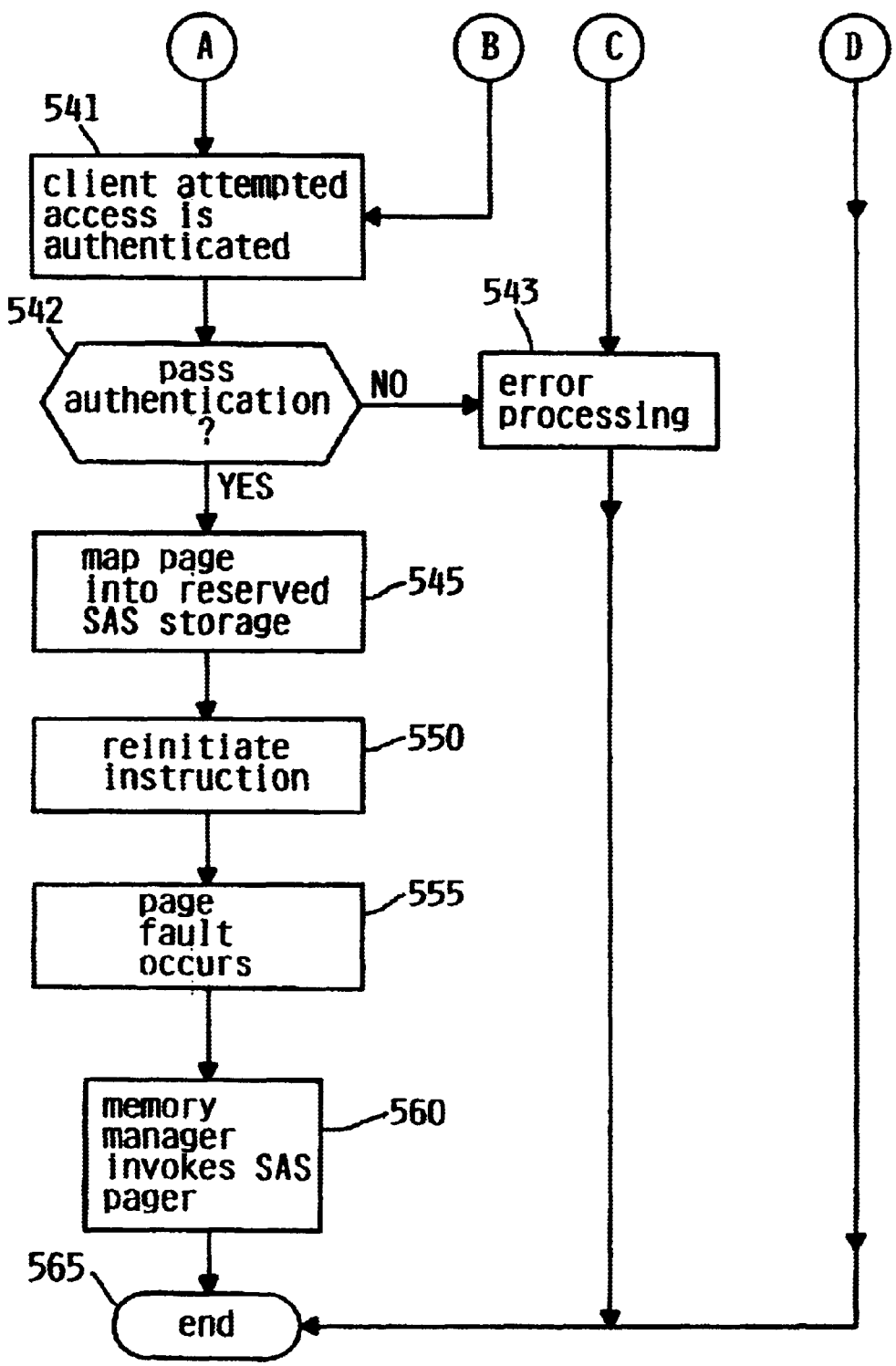

FIG. 5A is a diagram that shows the steps used in the preferred embodiment to process object access by client objects. For the purposes of the ensuing explanation, assume here that a client object on client 100 (i.e., one of client objects 210) wants to access a server object on server 200 (i.e., one of server objects 310). This processing begins with an object reference. In the preferred embodiment, the initial object references is obtained through the use of a finder mechanism (not shown). It should be noted, though, that the benefits and advantages of the present invention are provided after the object reference is obtained, and are in no way dependent upon the exact mechanism used to obtain it.

Figure 5B:
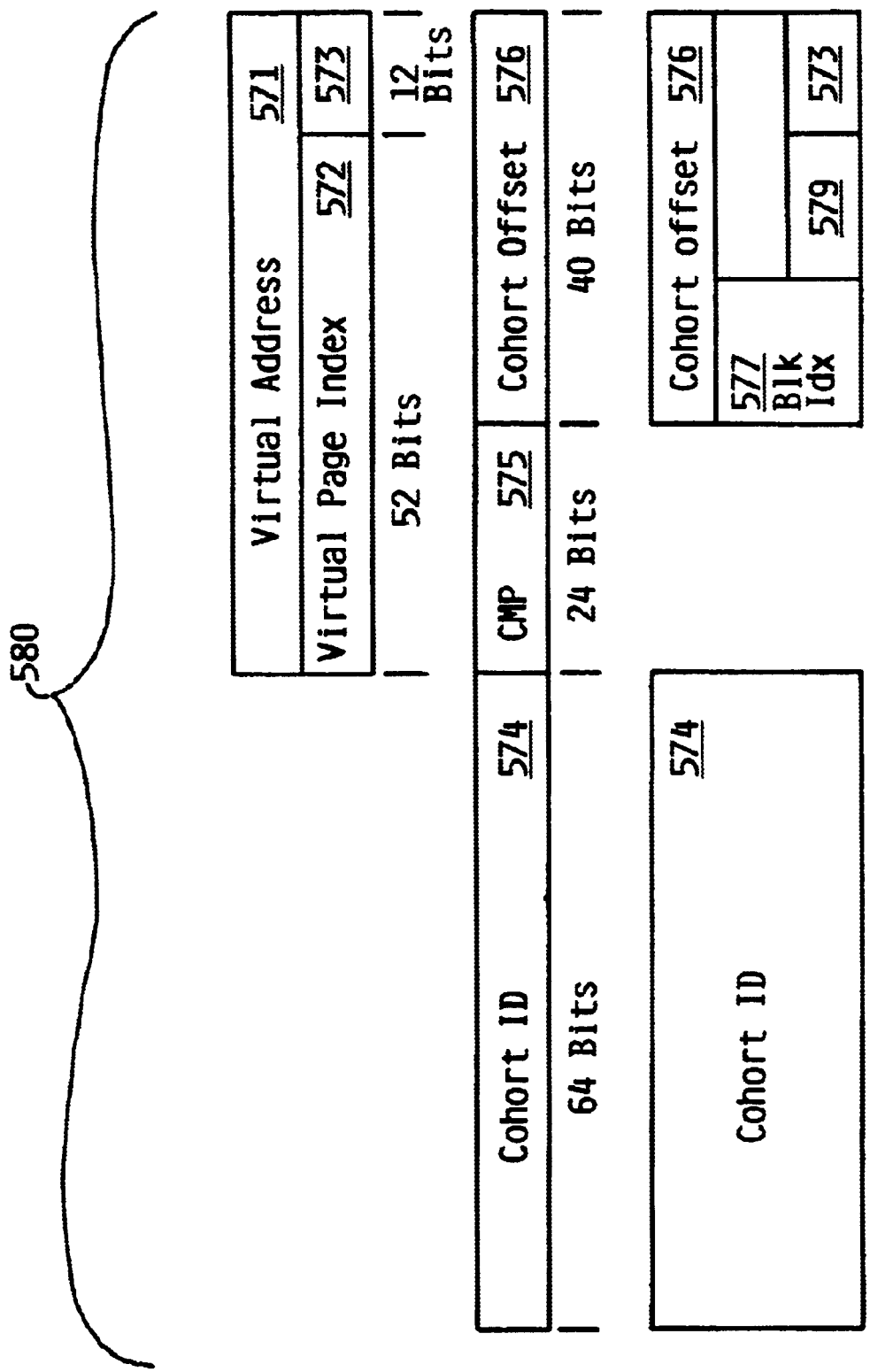
FIG. 5B is a diagram of the object reference of the preferred embodiment.

In block 505 a client object will attempt to gain access to the server object by invoking one of the server object's methods. This is accomplished through use of a virtual address contained in an object reference. Object reference 580 of the preferred embodiment is shown on FIG. 5B. It should be noted, though, that there are many different addressing schemes that could be used within the spirit and scope of the present invention. In the preferred embodiment, the complete virtual address space of the preferred embodiment is broken out into large chunks called cohorts. Each cohort contains $2^{40}$ (approximately one trillion) bytes of memory. A cohort is simply a convenient unit organizing the large distributed virtual address space. Each cohort is broken up into a series of blocks, which are themselves broken up into a series of pages.

In the distributed environment of the present invention, each cohort is uniquely identified by 64-bit cohort identifier 574. Within a cohort, any byte is uniquely identified by a 40 bit cohort offset. Therefore, it is possible to uniquely identify any address in the network by concatenating 64-bit cohort ID 574 with 40-bit cohort offset 576. This 104 bit value is known as the object identifier. On any given machine, unique cohort mapping prefix 575 is assigned for each 64-bit cohort identifier known to that machine. Cohort mapping prefix 575 is concatenated with cohort offset 576 to form a 64-bit virtual address that is valid for the subject computer system. The combination of the cohort ID and cohort offset is called the local object reference.

It will be observed that the 104-bit object reference does not fit within the 64-bit address space of CPU 101. A 64-bit cohort ID is used in order to conveniently assure uniqueness of the cohort identifier throughout a potentially large network of computer systems. While 64 bits are potentially needed to identify all cohorts in a very large network, it is presently much larger than that needed for identifying all cohorts on s single system. For object references that do not involve remote object access, virtual address 571 is formed by concatenating 24-bit cohort mapping prefix 575 and 40-bit cohort offset 576. Here, though, the discussion will center around the 104-bit object reference and the virtual address that is formed through contention of the lower 24 bits of cohort ID 574 with cohort offset 576 (i.e., since the present invention pertains to remote object access).

Returning to FIG. 5A, memory manager 223 will first determine whether the presented virtual address (i.e., virtual address 571) references memory that is mapped to the client program's process {block 510}. The question of whether memory is mapped to a particular process is essentially a determination into whether the subject client program has the general right to access the memory (i.e., the location within the distributed virtual address space of the preferred embodiment) that is the subject of the request. This is accomplished through use of a virtual memory segmentation table (not shown). If the requested access is permitted, the access proceeds on the normal course {block 512}. If the access is not permitted, memory manager 223 determines whether the requested access is to a portion of the distributed virtual address space that has been reserved for use by SAS server 220/320 {block 520}. This portion of the distributed virtual address space is referred to as the SAS region. The fundamental aspects of the management and use of the SAS region are described in a related patent application. This related patent application, which is entitled "Computer System Having Shared Address Space Among Multiple Virtual Address Spaces" (Ser. No. 08/771,550), is hereby incorporated by reference.

If the reference is not into the SAS region, normal error recovery processing takes place (i.e., because reference to non-mapped memory usually indicates the occurrence of an addressing error within the client program's processing steps) {block 543}. If in block 520, memory manager 223 determines that the object reference is into the SAS region, memory manager 223 will determine whether the server object being referenced is represented by an entry in the active block table {block 530}.

FIG. 5C shows the active block table of the preferred embodiment. Of particular interest in the discussion of this patent are virtual address range field 589, cohort ID field 591, media ID field 593, and authentication control field 595. The question of whether a server object is represented in the active block table is answered by determining whether the presented virtual address falls within one of the virtual address ranges (i.e., as identified by virtual address range field 589) in the table. If an entry is not present in the active block table, memory manager 223 will request location information from DLS 225 {block 535}, and update the active block table with the returned information {block 540}. Regardless of whether the active block table contains an entry for the requested object, the propriety client object's attempted access is ultimately tested in block 541 through the use of authentication control field 595. If the requesting client object does not have the necessary access rights, normal error processing takes place in block 543.

If the requesting client program does have the necessary access rights {block 542}, the memory page that contains the presented address is mapped into the SAS region {block 545}, which has the effect of reserving space for the client within the SAS region. This mapping is accomplished by placing an appropriate entry in the virtual memory segmentation table. Once the memory is mapped, the instruction that caused the initial address exception (i.e., that taken in block 510 of FIG. 5A) is reinitiated {block 550}. The reinitiation of the instruction will cause a page fault because even though the memory has been mapped for the client object, the actual memory page that houses the server object is not yet in place {block 555}. This page fault is similarly handled by memory manager 223. Since the virtual address causing the page fault is into memory that reserved for SAS storage (i.e., the SAS region), memory manager 223 knows that it needs to invoke SAS pager 222/322 {block 560} to handle the fault.

Figure 6:
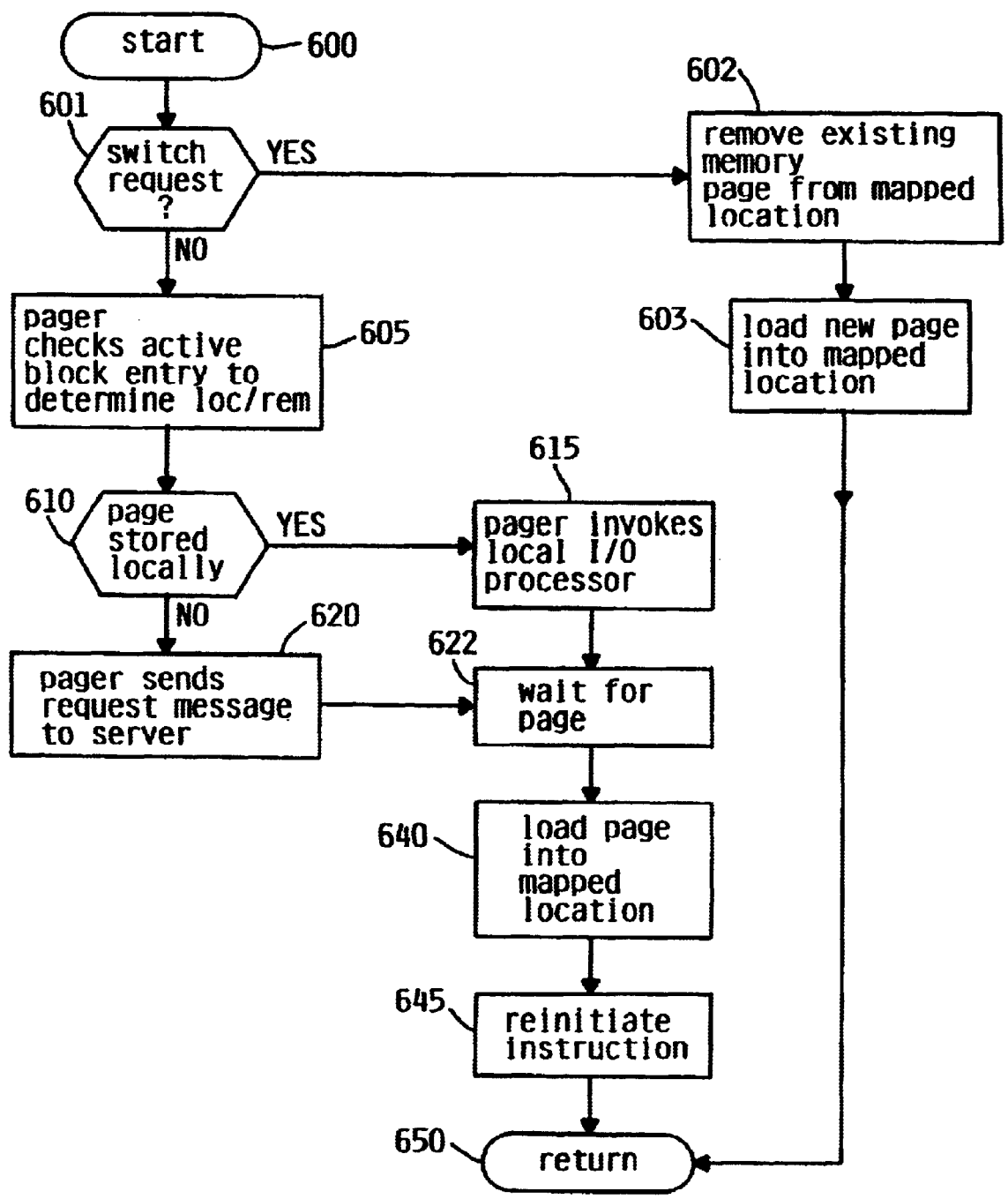
FIG. 6 is a diagram of the processing of the pager used in the preferred embodiment.

FIG. 6 shows the inner workings of pager 222. Pager 222 first checks whether it has been initiated as part of a switch request {block 601}. A switch request occurs when switch submechanism 415 determines that a change in the way objects are shipped (i.e., by proxy or not) is needed. At this stage of the example, assume that pager 222 was not initiated as part of a switch request. Accordingly, pager 222 next checks the active block table entry for the presented virtual address and determines, via reference to media ID field 593, whether the page associated with the request is stored locally or on another computer system {blocks 605 and 610}. If the page is stored locally, pager 222 invokes local I/O processor 405. It is then up to local I/O processor 405 to retrieve the page (in this case from HDD 285) and return it to pager 222. Since the particulars of this processing are not important to the present invention, details are not included here. However, those interested may refer to related application Ser. No. 08/771,050 for an explanation of how memory pages are retrieved from secondary storage. Continuing our example, assume here that pager 222 determines through reference to media ID field 593 that the requested page resides on server 200. This being the case, pager 222 sends a request message to server 200 {block 620} and waits for the page to be returned {block 622}.

Figure 7:
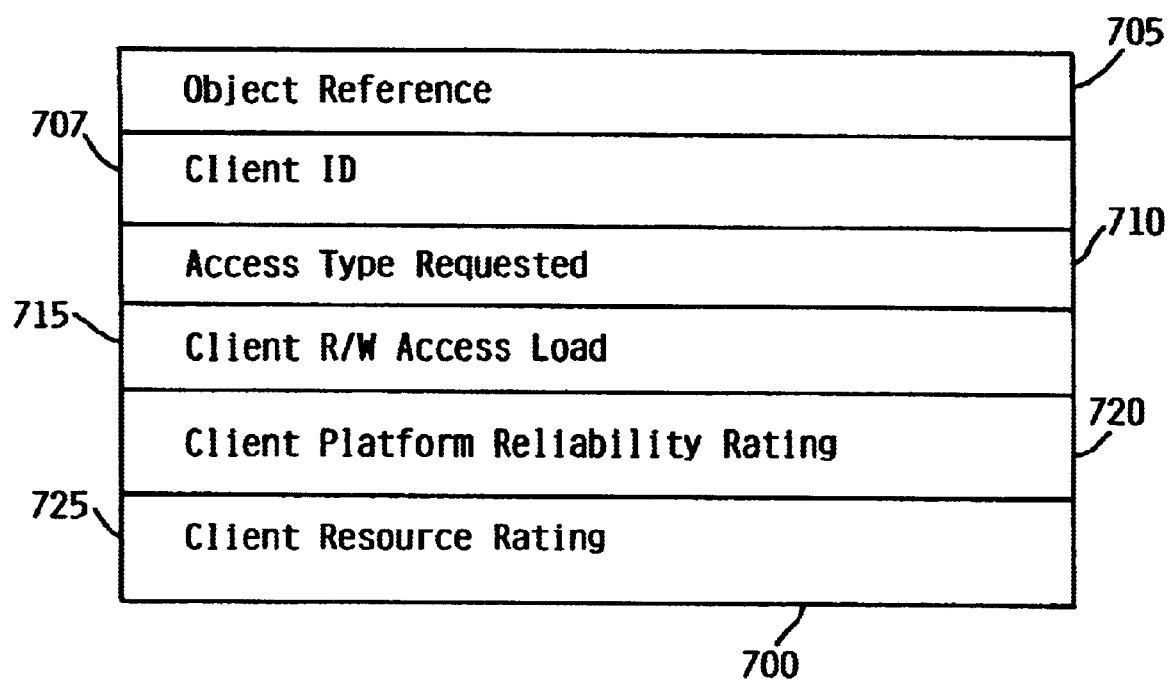
FIG. 7 is a diagram of the request message used in the preferred embodiment.

FIG. 7 shows the request message of the preferred embodiment. As shown, request message 700 comprises object reference 705, client ID 707, access requested field 710, client read/write access load 715, client reliability rating 720, client resource rating 725, and long transaction flag 730. As described above, object reference 705 is formed by concatenating cohort ID 574 with cohort offset 576 (see FIG. 5B). Client ID field 707 is a unique identifier for the requesting client program. In the preferred embodiment, the client ID value is obtained via a network service. Further details on how such an ID is obtained are not since such design details are not important vis-avis the present invention.

Access requested field 710 is used to communicate the type of access that is being requested by the client object (i.e., either read access or write access). Assume here that the client object is requesting write access to the server object. Client R/W access load (CRWAL) 715 is a value that indicates the demand for the subject server object on client 100 (i.e., by all of the client objects there). In the preferred embodiment, this value is calculated by tracking how many times access to the subject server object is requested per day; however, those skilled in the art will appreciate that other calculation means could be used and yet still fall within the spirit and scope of the present invention. Note here that a high CRWAL indicates that it might be best to ship the page containing the real object instead of the proxy object (i.e., due to the fact that the client objects of the requesting client may have need for continued access to the requested page). Client platform reliability rating (CPRR) 720 is a value that indicates how reliable client 100 is relative to the other computer systems in network 100. In the preferred embodiment, this value is calculated by tracking the number of times client 100 experiences catastrophic failure (i.e. failures requiring a soft or hard restart) per seven day period; however, those skilled in the art will appreciate that other calculation means are possible within the spirit and scope of the present invention. Client resource rating (CRR) 725 is a value that indicates the level of processing power that is available on client 100. In the preferred embodiment this is supplied by grading the client's processor speed, installed random access memory, and hard disk size relative to the other computer systems in network 100; however, those skilled in the art will appreciate that other grading means are possible within the spirit and scope of the present invention.

Figures 1, 8A:
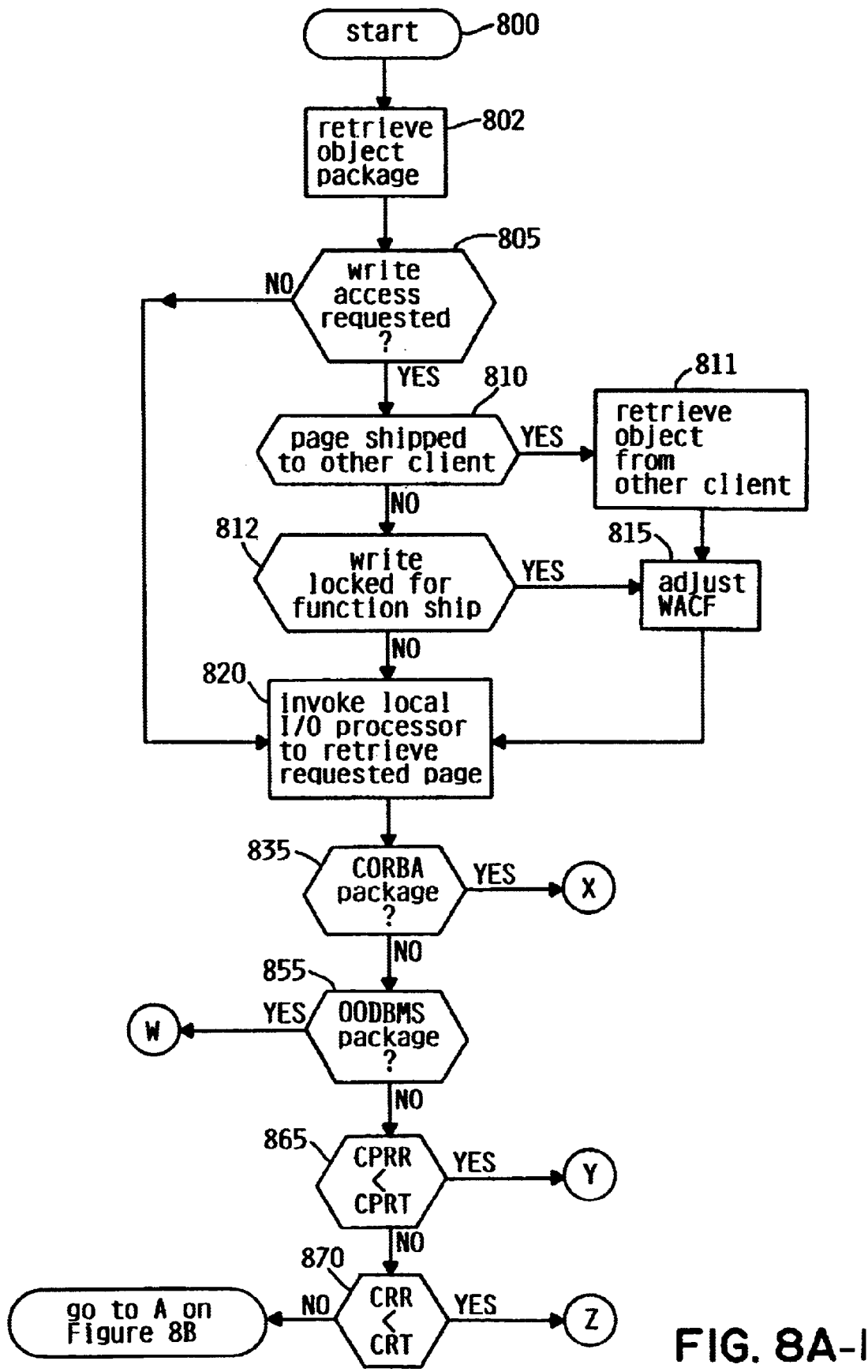
FIGS. 8A and 8B are diagrams of the processing of the shipper of the preferred embodiment.
Figures 2, 8A:
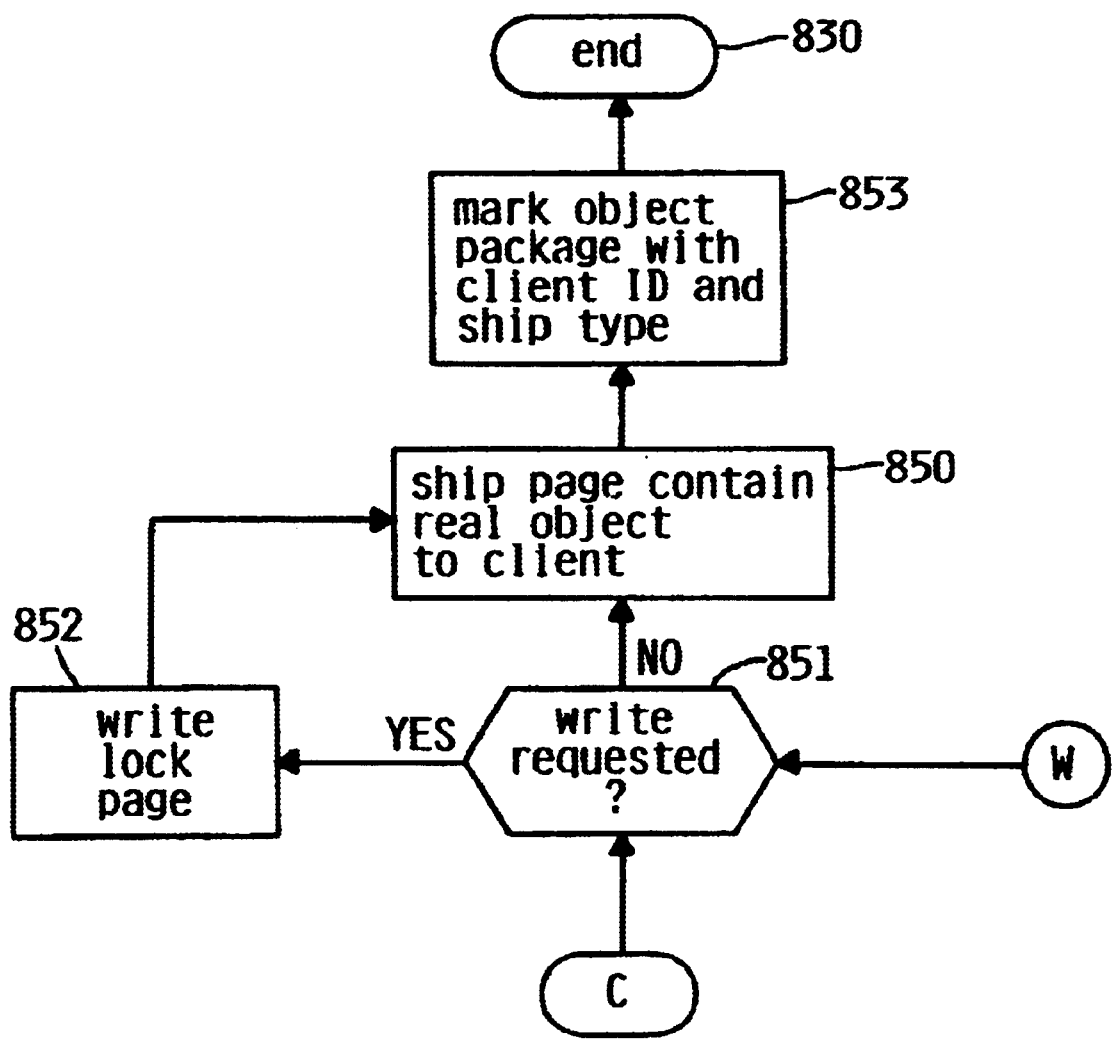
Figures 3, 8A:
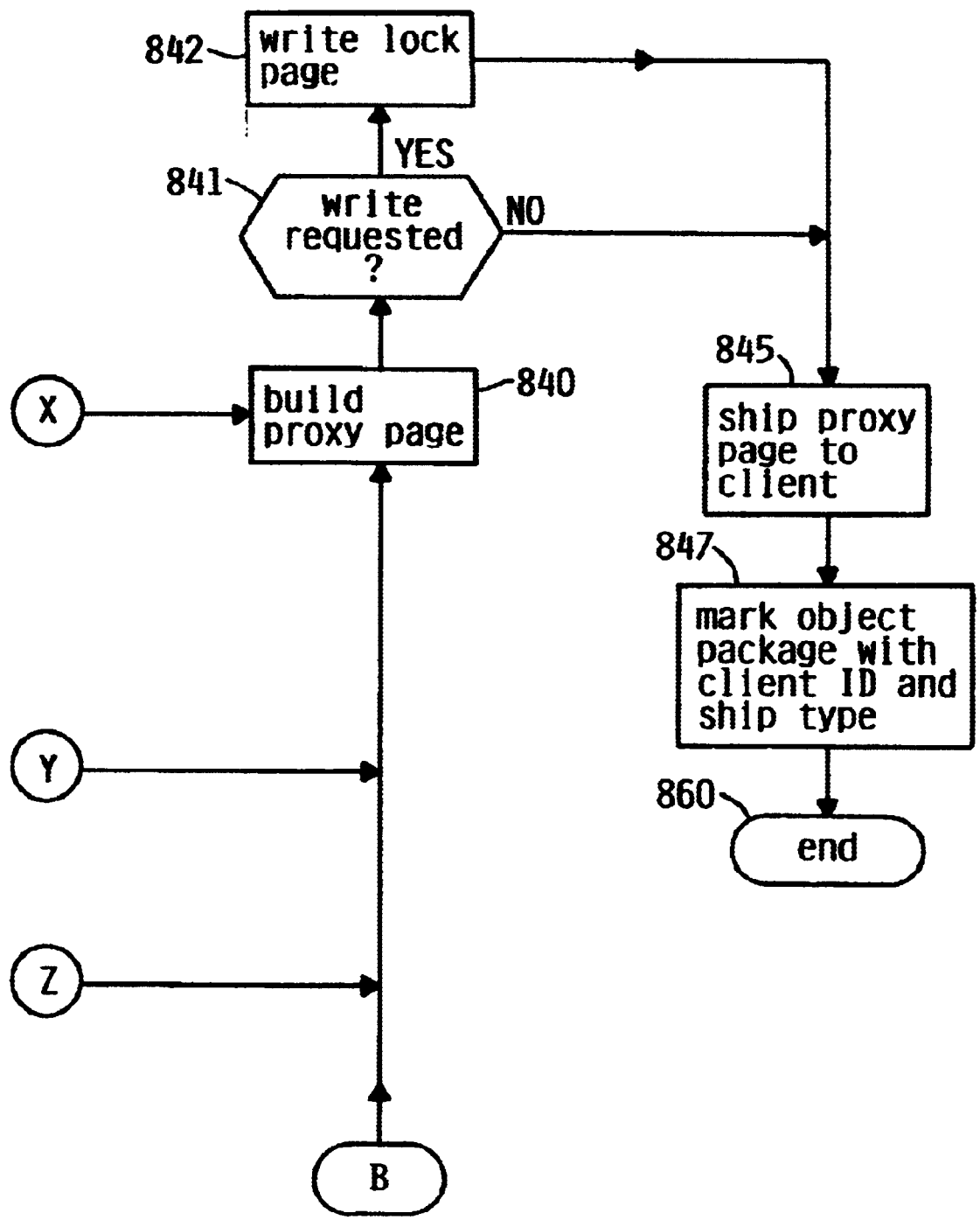
Figure 9:
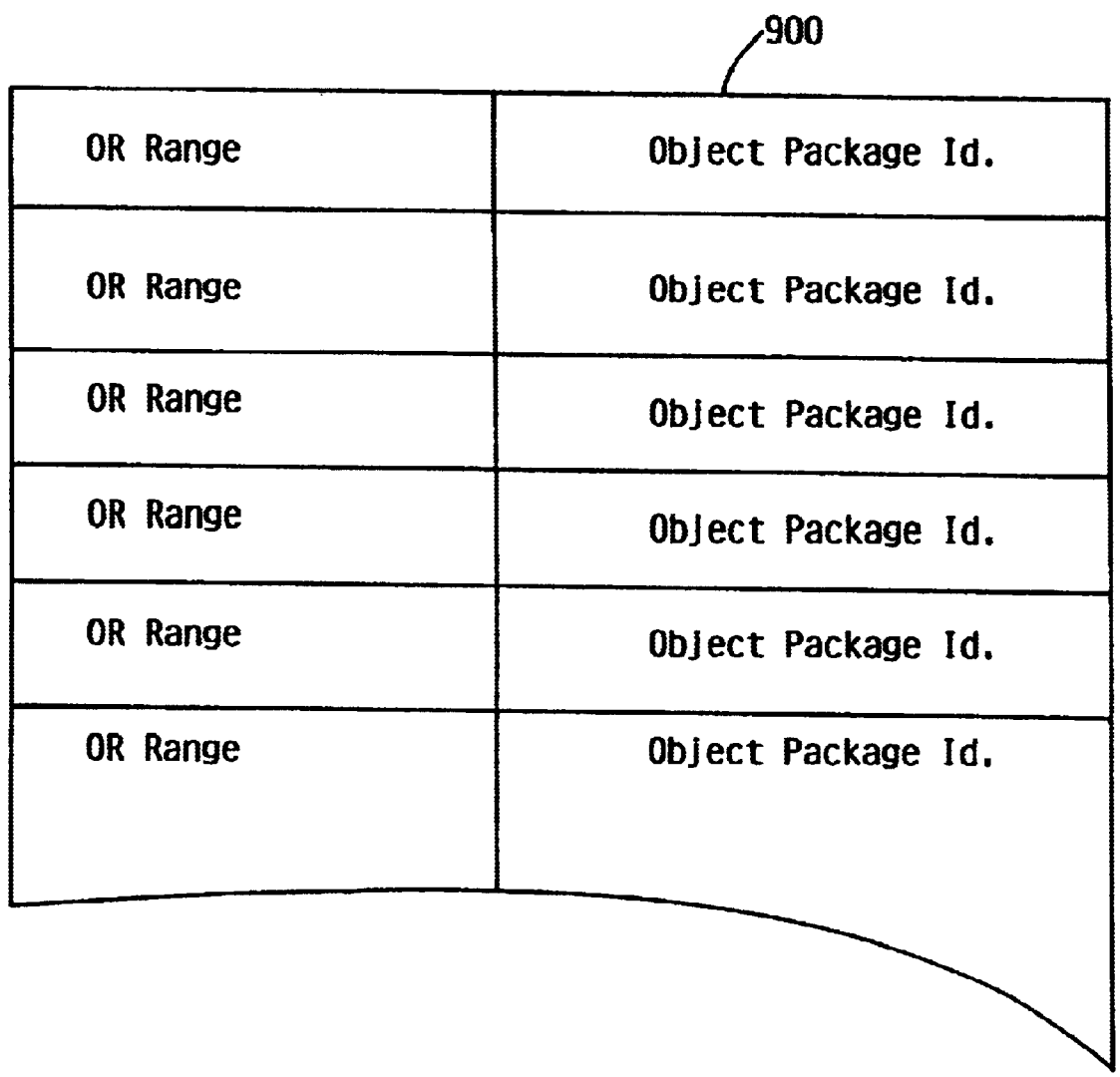
FIG. 9 is a diagram of the object reference/object package identifier table of the preferred embodiment.

Request messages are received on server 200 by shipper 410. FIG. 8A shows the inner workings of shipper 410. Shipper 410 first retrieves the object package associated with the request message {block 802}. This is accomplished via object reference/object package identifier table 900, which is shown on FIG. 9.

FIG. 10A shows the object package of the preferred embodiment. The object package construct is used in the preferred embodiment to determine the object access mode and to determine what objects (real or proxy) should be shipped to satisfy a client's request. Object package 1000 contains object package identifier 1005, which is what is used to correlate object references with packages in OR/OPID table 900. Package type 1010 is used to label the package of objects as 1) always requiring that the real object be shipped, 2) always requiring function shipping (i.e., by page shipping the proxy objects) or 3) requiring shipper 410 to dynamically determine whether the circumstances dictate that it is best to ship the real object or to ship the proxy object.

Client resource threshold (CRT) 1030 and client platform reliability threshold (CPRT) 1035 are used to determine whether client resource and reliability ratings are sufficient to justify shipping the real object. Page entries 1015 includes a page number field, a client IDs/ ship type pair field, and a write access collision frequency field (WACF). The WACF field is used to store a value that indicates how often objects for the subject page have been requested when subjected to a write lock while the proxy object is shipped out or when the real object was previously shipped out to another client.

Figure 10B:
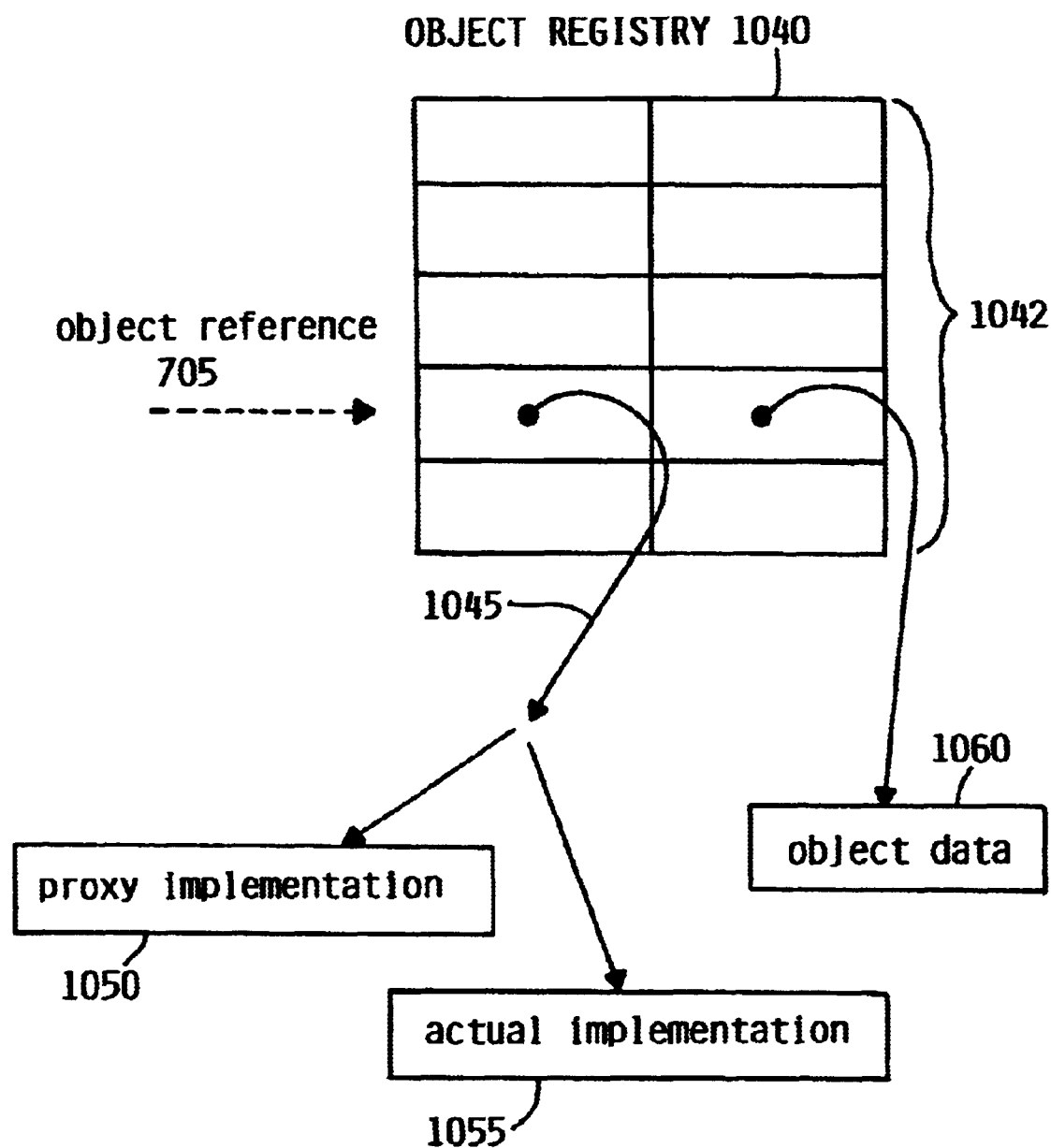
FIG. 10B is a diagram of the object registry of the preferred embodiment.

The WACF field and the remaining fields within each page entry are used by switch submechanism 415 to facilitate a dynamic change to the way (i.e., via a memory page with real objects or a memory page with proxy objects) a page was being shipped to a particular client. This facility is explained in more detail in the text associated with FIGS. 11A and 11B. Note here, though, that while only three example page entries are shown in FIG. 10A, different object packages may well have any number of client page entries present. The number of page entries will vary based upon the number of client objects that have a need for objects contained within the given package. Object registry 1040 is used by shipper 410 to retrieve the object (i.e., the real or proxy object) that is needed to satisfy the request. Object registry 1040 is explained in more detail in the text accompanying FIG. 10B and processing blocks 840, 845, and 850 of FIG. 8A.

Once the package has been retrieved, shipper 410 determines whether the access requested is read access or write access (i.e., through reference to access requested field 710 of the request message) {block 805}. Since write access is requested in our example, shipper 410 will next determine whether the real object has already been shipped out to another client {block 810}. If yes, the page containing the object is retrieved from the other client {block 811} and the WACF in the object package is adjusted to reflect the collision {block 815}. Note here that a high WACF suggests that the request should be serviced by shipping the proxy objects because performance could be enhanced by not continually shipping a page that has a high demand amongst client objects. It should also be understood that the retrieval of the page from the other client may amount to several processing steps (e.g., request, wait, retry) that are not important to the present invention, and are therefore, not described here. If the requested page is not currently out to another client {block 810}, but is instead write locked while the proxy object has been shipped out {block 812}, the WACF in the page entry for the subject page is similarly adjusted to reflect the collision {block 815}.

Either way, shipper 410 proceeds to invoke local I/O processor 405 to retrieve the block associated with the page that contains the requested object. If package type field 1010 of the packaged object indicates that the object is a CORBA object (i.e., one that always requires that the proxy object be shipped out {block 835}, a proxy page is built {block 840}. Note here that by "proxy page" we mean a memory page that contains proxy objects. A discussion of FIG. 10B is now necessary to understand the significance of a proxy page vis-à-vis the benefits and advantages of the present invention. FIG. 10B shows object registry 1040 of the preferred embodiment. Object registry 1040 contains a series of pointers to object implementation/data pairs (shown as 1042). Of particular importance to shipper 410, and to the mechanisms of the present invention, are the implementation pointers. These pointers are dynamically adjusted to point to either a proxy implementation (e.g., proxy implementation 1050) or an actual implementation (e.g., 1055). If a request is to be serviced via the function shipping model, the implementation pointer associated with the object reference is adjusted by shipper 410 to point to a proxy implementation; whereas, if a request is to be serviced by shipping out the actual referenced object, the implementation pointer is adjusted to point to the actual implementation.

Applying this explanation to our working example, consider object reference 705 (as shown on FIG. 10A). As has been previously explained, object reference 705 is used to identify the object that is the subject of the request. Shipper 410 uses object reference 705 as a key into object registry 1040. If shipper 410 determines that a proxy object should be shipped to the requesting client, shipper 410 will build a proxy page. This is accomplished by accessing the page that contains the real objects via pointer 1045 (see FIG. 10B) and constructing a proxy page of objects therefrom. The process of constructing proxy objects from real object is well known in the art and is not given further treatment here. Pointer 1045 is then rewritten to point to the proxy page such that requests for objects in that page will be handled by shipping the proxy objects. Subsequent requests will continue to be handled in this manner until expressly changed via system administration (i.e., via a change to package type field 1010 of the object package).

Figure 10C:
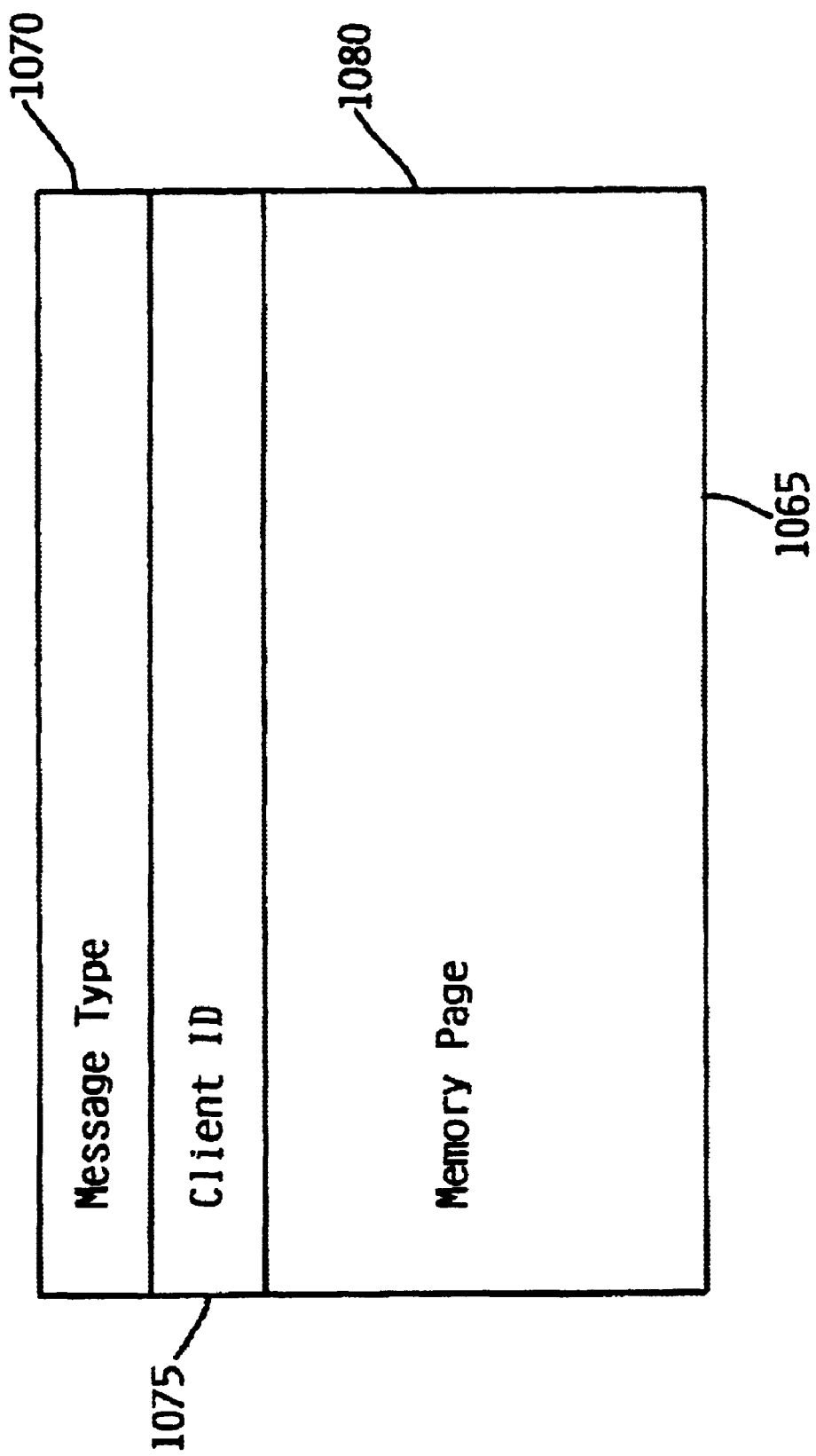
FIG. 10C is a diagram of the page message of the preferred embodiment.

Returning now to block 840 of FIG. 8A, the newly built proxy page will by locked if necessary {blocks 841 and 842} and sent to the client {block 845}. FIG. 10C shows the page message of the preferred embodiment. Page message 1065 comprises message type 1070, client ID 1075, and memory page 1080. Message type field 1070 is used within the preferred embodiment to specify whether the page associated with message has been sent in direct response to a client request (see client request message 700) or as part of a switch request. At this stage of the processing, page messages are sent in response to a client request. Details on switch request processing are provided in the following paragraphs. Once the page message has been sent, shipper 410 marks the object page with the client ID and the ship type (here proxy ship) {block 847} and terminates execution {block 860}. On the client side (i.e., client 100 in this case), the proxy object is used by the client object to perform method calls (as was described earlier with reference to the function shipping model). The proxy object (methods if you will) invokes services of ORB 237, which in turn sends the call over to the object server of ORB 327, where the real called method actually executes.

If package field 1010 does not indicate that the proxy object should always be shipped, but instead indicates that the real objects should always be shipped (i.e., because the package is marked as OODBS) {block 855}, the real object page is accessed via pointer 1045 of FIG. 10B, write locked if necessary {blocks 851 and 852} and shipped back to the requesting client {block 850}. In the preferred embodiment, though, the default is to allow the shipper to dynamically determine which mode is most appropriate. Accordingly, assume here that the request from client 300 is for an object that is part of an object package that has a package type field 1010 that indicates that shipper 410 should determine which shipping option is most appropriate under the circumstances.

Figure 8B:
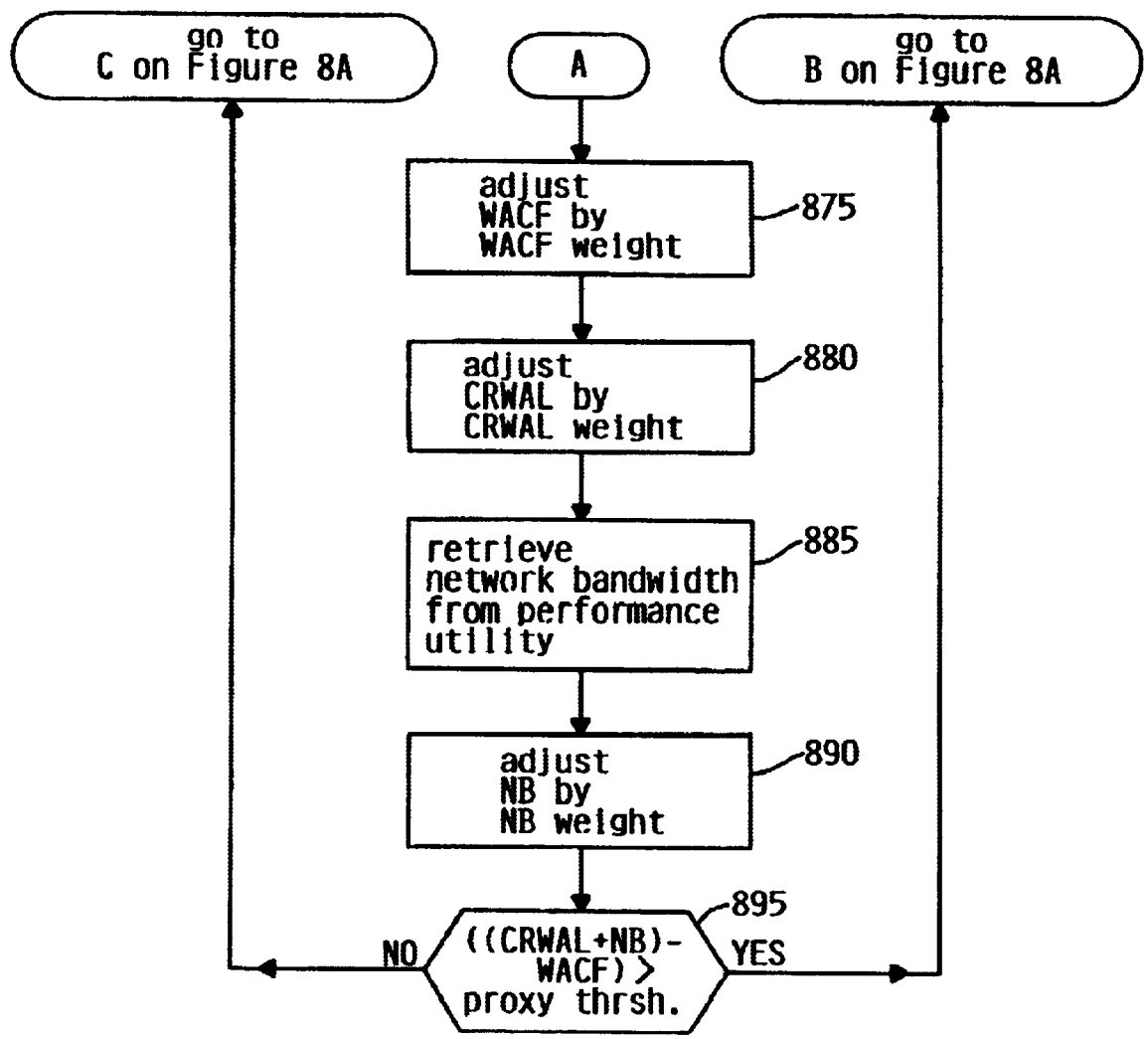

If in block 865 the client platform reliability rating is found to be less than the client platform reliability rating found in the object package, the client is not deemed to be reliable enough to house the requested page (even for a short period of time). Accordingly, shipper 410 would decide to service the request by shipping a proxy object page {blocks 840 and 845}. If in block 870 the client platform resource rating is found to be less than the client resource rating found in the object package, the client is not deemed to have enough processing power to handle the requested page. Accordingly shipper 410 will similarly decide to service the request by shipping the proxy object page {blocks 840 and 845}. If the client is deemed to be reliable and powerful enough, shipper 410 will proceed to weigh the more dynamic factors and make its decision on that basis. This processing is shown on FIG. 8B, where shipper 410 begins by adjusting the write access collision frequency by the WACF weight {block 875}. Note here that weights are used in the preferred embodiment to provide tunability, and that in reality, the exact mechanism used is not important vis-à-vis the spirit and scope of the present invention. For instance, other possibilities might be the direct use of the values themselves or a more complicated weighting algorithm that accounted for more variant factors such as time of day.

In block 880, the client read/write access load is adjusted by the client read/write access load weight. In block 885, the current network bandwidth is retrieved from an on board performance utility. Note here that the precise mechanism used to retrieve this information is not important to the present invention, and further details are not provided here. Once retrieved, the network bandwidth is adjusted by the network bandwidth factor {block 890}. Since the network bandwidth and CRWAL militates in favor of shipping the proxy object and WACF militates in favor of shipping the real object page, the network bandwidth and CRWAL are combined before being offset by the WACF and compared to a proxy threshold {block 895}. The proxy threshold, like the other thresholds used in the preferred embodiment, is provided for tunability. If the result of the calculation exceeds the proxy threshold, shipper 410 decides to service the request by shipping the proxy object page {blocks 840 and 845}. If not, shipper 410 decides to service the request by sending the real object page {block 850}.

As an aside, it is important to note that the present invention is not limited to the environment factors (e.g., network bandwidth, CRWAL, CRT, and CPRT) used in the preferred embodiment. Those skilled in the art will appreciate that other calculations that involve other environment factors are possible within the spirit and scope of the present invention.

Returning now to FIG. 6, the page with the requested server object and the associated object package are returned back across communications mechanism 150 to client 100. Upon receipt of the page, pager 222 will load the page into memory {block 640} and reinitiate the instruction {block 645}. From this point, processing continues as if the access had been to a locally stored server object.

FIGS. 11A and 11B show the switch processing of the preferred embodiment. As indicated above, this processing is performed by switch submechanism 415. Switch submechanism 415, which begins in block 1100 of FIG. 11A, runs periodically to determine whether system or network condition warrant a change to the object access mechanism being used to service requests for the objects stored on its computer system. In the preferred embodiment, switch submechanism 415 is scheduled to run every three (3) minutes, but other intervals could be used. After retrieving the first/next object package in block 1105, switch submechanism 415 determines whether the package is a CORBA or OODBMS package. If the package is either a CORBA or OODBMS package, switch submechanism 415 skips the package and proceeds to block 1163 of FIG. 11B to determine if there are more packages to process. As explained earlier, packages marked as CORBA or OODBMS have been configured to always be served in a particular way (i.e., via page shipping or via proxy shipping). If the package has not been configured in this manner, switch submechanism 415 retrieves the first/next page entry in block 1115.

Switch submechanism 415 then retrieves the WACF from the page entry and applies the WACF weight {block 1119} and retrieves the network bandwidth {block 1123} and applies the network bandwidth weight {block 1125}. At this point switch submechanism 415 transitions to processing block 1143 of FIG. 11B. There, the WACF is subtracted from the network bandwidth and compared to a switch threshold. If the difference between the network bandwidth and the write access collision frequency of the subject page is greater than the switch threshold, switch submechanism 415 knows that requests for the page should be handled via a proxy page. Accordingly, switch submechanism 415 checks whether a proxy page was already sent to this particular client by checking the ship type field in the page entry {block 1145}. If so, switch submechanism 415 checks whether there are more client Ids in the page entry {block 1147} and either checks the next client Id/ship type pair {block 1145 again} or determines whether there are more pages in the object package {block 1159}. If a proxy page was not already sent to the particular client {block 11445}, switch submechanism 415 builds a proxy page {block 1151}, sends a switch message to the affected client {block 1149}, changes the ship type in the client Id/ship type pair field to be proxy ship{block 1157}, and then checks for more pages in the object package {block 1159}.

Returning now to block 1143, if the difference between the network bandwidth and the write access collision frequency of the subject page is not greater than the switch threshold, switch submechanism 415 knows that requests for the page should be handled by shipping the real object page. Note here that by "real object page" we mean a memory page that contains the real objects. Accordingly, switch submechanism 415 checks whether the real object page was already sent to this particular client. Again, this is done by checking the ship type field in the page entry. If so, switch submechanism 415 checks whether there are more client Ids in the page entry {block 1140} and either checks the next client Id/ship type pair {block 1141 again} or determines whether there are more pages in the object package {block 1159}. If the real object page was not already sent to the particular client {block 11445}, switch submechanism 415 retrieves the real object page {block 1150}, sends a switch message to the affected client {block 1149}, changes the ship type in the client Id/ship type pair field to be proxy ship{block 1157}, and then checks for more pages in the object package {block 1159}.

Each page in the object package is processed in the above-described manner (i.e., processing blocks 1115 through 1161 of FIGS. 11A and 11B) until switch submechanism 415 determines in block 1159 that there are not any more pages in the object package. When this occurs, switch submechanism 415 determines whether there are more object packages to process {block 1163}. If there are more object packages on the server machine, switch submechanism 415 proceeds to block 1105 of FIG. 11A and begins the process anew for the next object package. If there are not more object packages on the server, switch submechanism 415 terminates execution in block 1167.

Returning now to FIG. 6, the page message is received by pager 222 upon initiation in block 600. Determining that it has been initiated to handle a switch request (i.e., via message type field 1070 of page message 1065—see FIG. 10C) {block 601}, pager 222 removes the existing memory page from the mapped location {block 602}, loads the new page from the page message into the mapped location {block 603}, and terminates execution in block 850.

Class Shipping

It should be understood that those skilled in the art will appreciate that the above-described mechanisms apply equally to that which is known in the industry as the JAVA class shipping model. Under the current usage of class shipping, the classes are sent from a server computer to a client computer as a stream file. Upon receipt by the client virtual machine, the classes are activated by the client into the requesting application's virtual address space and then utilized to construct running object instances.

Using the mechanisms described above, class shipping can be supported by creating an object package for the classes. The shipper mechanism keeps the classes persistently activated in the shared virtual address space. As the classes are accessed by clients, these persistently activated classes are shipped in memory pages from the server computer in the same manner as object pages.

Without persistently activated classes, the object registry that normally refers to the persistent class instances is modified to hold class markers. The markers are recognized by the client virtual machine and are filled in as pointers to the locally activated class instances (either proxy or actual classes) before being accessed by the client applications.

ADVANTAGES OF THE INVENTION

A principal advantage of this invention is to support more than one remote access model on a single server.

Another advantage of the present invention is support for the two most popular remote object access models under a single unified system.

Yet another object of the present invention is the ability to administratively define a remote object access policy for a group of server objects.

Yet another advantage of the invention is selection of the most appropriate remote object access model upon initial access to a server object by a client object.

Yet another advantage of the present invention is to dynamically switch between more than one remote access model.

Still another advantage of the present invention is to dynamically switch between more than one remote access model while a shared server object is actively serving more than one client object request.

Still another advantage provided by the present invention is the ability dynamically switch between service of remote access policies based on a variety of factors.

Still another advantage of the present invention is to combine the benefits of several of the most prevalent remote object access models into a single remote object access model while limiting the impact to existing source code.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A first computer system, said first computer system comprising:
   a bus;
   a central processing unit;
   computer system memory, said computer system memory being connected to said central processing unit via said bus;

at least one server object, said server object being stored in said computer system memory; and a shipper contained in said computer system memory for execution on said central processing unit, said shipper being used to ship said at least one server object to a second computer system, said shipper being able to ship said at least one server object to said second computer system via more than one remote object access model.

2. The computer system of claim 1 wherein one of said more than one remote access model is a page shipping model.

3. The computer system of claim 1 wherein one of said more than one remote access model is a function shipping model.

4. The computer system of claim 1 wherein said shipper mechanism is capable of dynamically switching between said more than one remote object access model based on at least one environment factor.

5. A first computer system, said first computer system comprising:
    a bus;
    a central processing unit;
    computer system memory, said computer system memory being connected to said central processing unit via said bus;
    at least one server object, said server object being stored in said computer system memory; and
    a shipper contained in said computer system memory for execution on said central processing unit, said shipper being used to ship said at least one server object to a second computer system, said shipper being able to ship said at least one server object to said second computer system via more than one remote object access model, said shipper mechanism being capable of dynamically switching between said more than one remote object access model.

6. The computer system of claim 5 wherein one of said more than one remote access model is a page shipping model.

7. The computer system of claim 5 wherein one of said more than one remote access model is a function shipping model.

8. A network of computer systems, said network including a first computer system and a second computer system:
    said first computer system comprising:
        a first bus;
        a first central processing unit;
        first computer system memory, said first computer system memory being connected to said first central processing unit via said first bus;
        at least one client object contained in said first computer system memory, said client object being used to make remote object access calls to a server object;
    said second computer system comprising:
        a second bus;
        a second central processing unit;
        second computer system memory, said second computer system memory being connected to said second central processing unit via said second bus;
        said server object, said server object being contained in said second computer system memory; and
        a shipper contained in said computer system memory for execution on said central processing unit, said shipper being used to ship said at least one server object to a second computer system, said shipper being able to ship said at least one server object to said second computer system via more than one remote object access model, said shipper mechanism being capable of dynamically switching between said more than one remote object access model.

9. The computer system of claim 8 wherein one of said more than one remote access model is a page shipping model.

10. The computer system of claim 8 wherein one of said more than one remote access model is a function shipping model.

11. A program product, said program product comprising:
    a shipper, said shipper being used to ship at least one server object from a first computer system to a second computer system, said shipper being able to ship said at least one server object to said second computer system via more than one remote object access model; and
    signal bearing media bearing said shipper.

12. The program product of claim 11 wherein one of said more than one remote access model is a page shipping model.

13. The program product of claim 12 wherein said signal bearing media is recordable media.

14. The program product of claim 11 wherein one of said more than one remote access model is a function shipping model.

15. The program product of claim 11 wherein said signal bearing media is transmission type media.

16. A program product, said program product comprising:
    a shipper, said shipper being used to ship at least one server object from a first computer system to a second computer system, said shipper being able to ship said at least one server object to said second computer system via more than one remote object access model, said shipper mechanism being capable of dynamically switching between said more than one remote object access model; and
    signal bearing media bearing said shipper.

17. The program product of claim 16 wherein said shipper mechanism is capable of dynamically switching between said more than one remote object access model based on at least one environment factor.

18. The program product of claim 16 wherein one of said more than one remote access model is a page shipping model.

19. The program product of claim 16 wherein one of said more than one remote access model is a function shipping model.

20. The program product of claim 16 wherein said signal bearing media is transmission type media.

21. The program product of claim 16 wherein said signal bearing media is recordable media.

22. A computer-implemented method, said method comprising the steps of:
    receiving a remote object access request from a client computer system for access to a server object;
    evaluating at least one environment factor; and
    selecting a remote access model based on said evaluating step, said remote access model being one of at least two remote access models that are available for selection; and shipping said server object to said client computer system using said remote access model.

23. The computer-implemented method of claim 22 wherein one of said at least two access models is a page shipping model.

24. The computer-implemented method of claim 22 wherein one of said at least two access models is a function shipping model.

\* \* \* \* \*